United States Patent [19]
Tanase et al.

[11] Patent Number: 5,968,678
[45] Date of Patent: Oct. 19, 1999

[54] MAGNETO-OPTICAL RECORDING MEDIUM AND MANUFACTURING METHOD THEREOF

[75] Inventors: Kenji Tanase; Atsushi Yamaguchi, both of Gifu; Yoshihisa Suzuki, Aichi; Satoshi Sumi; Yoshiharu Uchihara, both of Gifu; Seiji Murata, Osaka; Kenji Torasawa, Gifu, all of Japan

[73] Assignee: Sanyo Electric., Ltd., Osaka, Japan

[21] Appl. No.: 08/689,149

[22] Filed: Jul. 30, 1996

[30] Foreign Application Priority Data

| Aug. 31, 1995 | [JP] | Japan | 7-224387 |
| Nov. 22, 1995 | [JP] | Japan | 7-304345 |
| Nov. 24, 1995 | [JP] | Japan | 7-329915 |
| Nov. 30, 1995 | [JP] | Japan | 7-313148 |

[51] Int. Cl.$^6$ .................................................. G11B 5/66
[52] U.S. Cl. ........................... 428/694 ML; 428/694 SC; 428/694 LE; 428/694 GT; 428/694 MT; 428/694 RE; 428/494 MM; 428/694 EC; 428/900; 369/13
[58] Field of Search ...................... 369/13; 428/694 ML, 428/694 SC, 694 LE, 694 GT, 694 MT, 694 RE, 694 MM, 694 EC, 900

[56] References Cited

U.S. PATENT DOCUMENTS

| 4,925,742 | 5/1990 | Sugawara et al. | 428/692 |
| 5,334,424 | 8/1994 | Hani et al. | 428/1 |
| 5,428,585 | 6/1995 | Hirokane et al. | 369/13 |
| 5,428,586 | 6/1995 | Kobayashi et al. | 369/13 |
| 5,452,272 | 9/1995 | Murukami et al. | 369/13 |
| 5,563,852 | 10/1996 | Murakami et al. | 369/13 |
| 5,612,131 | 3/1997 | Bojarczuk et al. | 428/332 |
| 5,663,935 | 9/1997 | Nishimura | 369/13 |
| 5,666,346 | 9/1997 | Nishimura | 369/275.2 |
| 5,736,265 | 4/1998 | Tanaka et al. | 428/694 ML |

FOREIGN PATENT DOCUMENTS

| 509836A2 | 10/1992 | European Pat. Off. . |
| 586175A1 | 3/1994 | European Pat. Off. . |
| 596716A2 | 5/1994 | European Pat. Off. . |

OTHER PUBLICATIONS

Nikkei Electronics, 1993; 7–5, No. 585, pp. 163–170.
SPIE vol. 1316, Optical Data Storage, 1990, pp. 271–277.
JJAP Series 6, Proc. Int. Symp. on Optical Memory, 1991, pp. 203–210.
Optical Data Storage, 1994, Technical Digest Series vol. 10, pp. 128–129.
Technical Study Report of the Institute of Electronics, Information and Communication Engineers, Mar. 1, 1996.
Magneto Optical Recording International Symposium—96, Apr. 29–May 2, 1996.
1996 Digests of Intermag '96, Apr. 9–12, 1996.

*Primary Examiner*—Leszek Kiliman
*Attorney, Agent, or Firm*—Armstrong, Westerman, Hattori, McLeland & Naugton

[57] ABSTRACT

In magneto-optical recording medium, on a transparent substrate of polycarbonate resin, an SiN film having the thickness of 600 to 800 Å and surface roughness Rmax of at most 10 nm is formed. On the SiN film, a GdFeCo reading layer having the thickness of 800 to 1200 Å with Gd content of 30 to 36 at. % and Co content of 12 to 50 at. % is formed. On the reading layer, a TbFeCo recording layer of which Co content is 10 to 16 at. % is formed. The recording layer is a perpendicular magnetization film, and the reading layer is an in-plane magnetization film. At the time of reading, the reading and recording layers are heated, and the direction of magnetization of the recording layer is transferred to the reading layer only in the prescribed heated area. Information can be read only from the transferred portion, and thus a super resolution effect is obtained. When Kerr rotation angle $\theta_K$ is measured for the light reflected from the reading layer while the temperatures of the reading and recording layers are elevated, $\theta_K$ is approximately in proportion to Cth power of the elevated temperature t, wherein C is at least 8.0.

6 Claims, 24 Drawing Sheets

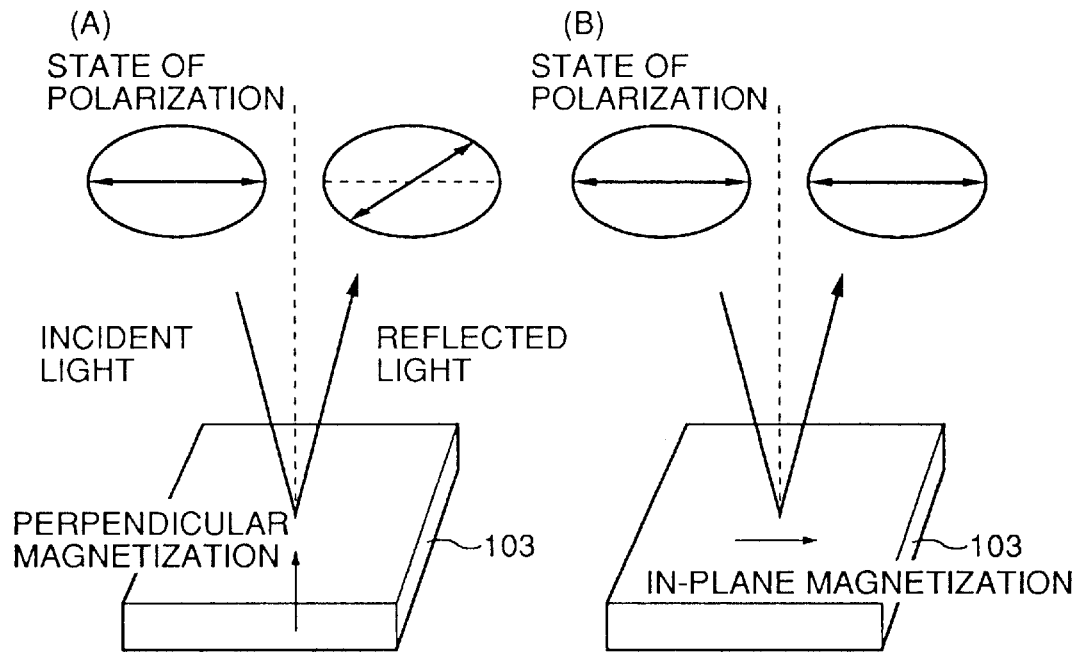
Fig.3A
(A) STATE OF POLARIZATION
INCIDENT LIGHT   REFLECTED LIGHT
PERPENDICULAR MAGNETIZATION   103
Fig.3B
(B) STATE OF POLARIZATION
IN-PLANE MAGNETIZATION   103
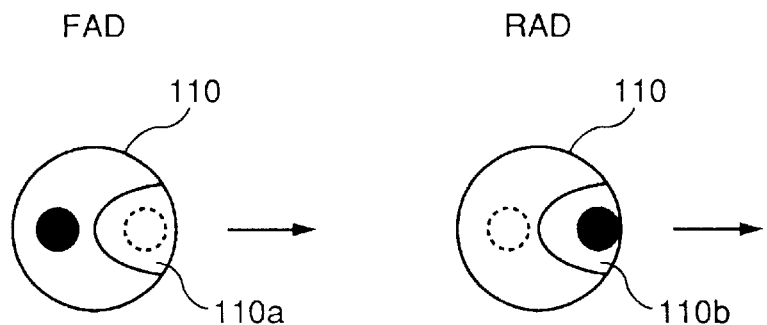
Fig.4A  FAD
Fig.4B  RAD

EXAMPLE 1

EXAMPLE 2

(a) CONVENTIONAL TECHNIQUE IN WHICH RECORDING IS DONE WITH CONTINUOUS LASER BEAM IRRADIATION (b) TECHNIQUE IN WHICH RECORDING IS DONE WITH PULSED LASER, OR IN WHICH HEAT DIFFUSION LAYER IS PROVIDED (c) TECHNIQUE IN WHICH HEAT DIFFUSION LAYER IS PROVIDED AND RECORDING IS DONE WITH PULSED LAYER BEAM

MAGNETO-OPTICAL RECORDING MEDIUM AND MANUFACTURING METHOD THEREOF

BACKGROUND OF THE INVENTION

1. Field of the Invention

The present invention relates to a magneto-optical recording medium including an exchange coupling magnetic layer essentially consisting of a recording layer and a reading layer, which attains high density recording by transferring the direction of magnetization in the recording layer to the reading layer for reading, and to manufacturing method thereof.

2. Description of the Background Art

A magneto-optical recording medium has attracting attention as a recording medium which is rewritable and having large storage capacity and high reliability. It has come to be used as a computer memory, for example. However, as the amount of information increases and the device is made smaller, recording/reading technique with higher density has been desired.

The technique for recording and reading with high density includes techniques related to the apparatus for recording and reading, and techniques for the medium. The former techniques include an optical super resolution technique for obtaining a convergence spot exceeding diffraction limit of laser beam, and a technique for making shorter the wavelength of the laser beam. The latter techniques include narrowing the pitch of the medium, and improvement of the reading resolution by using magnetic multi-layered films. The technique for improving the reading resolution by using a magnetic multi-layered film includes a technique in which the state of the recording layer is selectively transferred to the reading layer and the state of the reading layer is read, utilizing the fact that temperature distribution of the laser spot has Gaussian distribution. In a magneto-optical recording medium used for the optical super resolution technique, a recording layer which is magnetized in a direction perpendicular to the disc surface has been generally used. As a substrate for the medium, generally, a glass substrate has been used.

In *NIKKEI ELECTRONICS* 1993, 7.5 (No. 585) pp. 163–170, a magneto-optical disc including a magnetic film consisting of a reading layer and a recording layer is disclosed. The conventional magneto-optical disc disclosed in this paper will be described. FIG. 1 shows the structure of the disclosed medium. On a glass substrate 101, an APN dielectric layer 102 having the thickness of 80 nm, a GdFeCo reading layer 103 having the thickness of 40 nm, a DyFeCo recording layer 104 having the thickness of 40 nm, an APN dielectric layer 105 having the thickness of 20 nm, and a protective layer 107 are formed in this order. In the magneto-optical disc, the magnetic material of which the recording layer is formed is magnetized in the perpendicular direction and records information. Meanwhile, the reading layer is formed of a magnetic film in which in-plane magnetization occurs at room temperature and perpendicular magnetization occurs at high temperature. The principle of reading from a magneto-optical disc using such an in-plane magnetic film as the reading layer is as shown in FIG. 2. When the magneto-optical disc is irradiated with laser beam 17, intensity of the laser spots has Gaussian distribution. Therefore, temperature distribution of the magnetic film also tends to have Gaussian distribution, as shown in the figure. Since the magnetic material of which the direction of magnetization changes from in-plane to perpendicular direction when the temperature exceeds 120° C. is used as the reading layer, only the area 13a of reading layer 13 where the temperature exceeds 120° C. because of laser beam 17 is magnetized in the perpendicular direction, in accordance with the direction of magnetization of the corresponding portion of recording layer 14. Thus, the information of recording layer 14 is transferred to reading layer 13, enabling reading of the information in recording layer 14. Reading of information from the transferred portion is realized, utilizing Kerr effect. Kerr effect refers to the effect that when light is reflected from a magnetic body, the plane of polarization of the reflected light is rotated. In the magneto-optical disc, the rotation angle is read as an output signal. As shown in FIG. 3A, when reading layer 103 which is in the state of perpendicular magnetization is irradiated with light, the Kerr rotation angle on the plane of polarization becomes maximum. Meanwhile, as shown in FIG. 3B, when reading layer 103 in the state of in-plane magnetization is irradiated with light, there is hardly a rotation of the plane of polarization. Referring to FIG. 2, at the center of the spot of laser beam 17 where temperature is high, magnetization of reading layer is perpendicular, and at other portions, magnetization is in-plane. Therefore, at the center of the spot, the aforementioned Kerr effect occurs, while at other portions, Kerr effect does not occur. Therefore, only the signal at the center of the spot can be detected, and other portions are masked by in-plane magnetization. As shown in FIG. 2, the area where the threshold value 120° C. is exceeded can be made smaller than the laser spot diameter. Accordingly, information of the area which is smaller than the laser spot diameter can be read, which means that a higher recording density is possible. Such an effect is referred to as magnetically induced super resolution (MSR). As to writing of information to the recording layer, when a portion of the recording layer which has been heated to a temperature not lower than Curie temperature by the laser beam comes to be off the laser beam and the temperature thereof becomes lower than Curie temperature, it is magnetized in the direction of an external magnetic field. Recording of information by perpendicular magnetization is performed in this manner. In magnetic field modulation recording with continuous irradiation, the medium is continuously irradiated with the laser beam at the time of recording. Meanwhile, in laser pulse magnetic field modulation recording, pulse laser is emitted, and the cycle of heating to at least Curie temperature and cooling is repeated in an instant during recording.

SPIE Vol. 1316 *Optical Data Storage* (1990)/271–277 discloses a method of high density magneto-optical recording using magnetic field modulation and pulsed laser irradiation. In the magneto-optical disc disclosed in this paper, a TbFeCo recording layer having Curie temperature of 180° C. is formed on a glass substrate.

The method of detection for MSR includes a center aperture detection (CAD), a front aperture detection (FAD) and a rear aperture detection (RAD). In the CAD, information of the recording layer is read through the reading layer at the central portion of the laser beam spot irradiated for heating. In the FAD, as shown in FIG. 4A, a portion 110a in front of the disc proceeding direction is masked at the laser beam spot 110, and other portions are opened. In the RAD, as shown in FIG. 4B, a portion 110b in front of the disc proceeding direction of the laser beam spot 110 is opened and other portions are masked. JJAP Series 6 *Proc. Int. Symp. on Optical Memory*, 1991, pp. 203–210 discloses a structure of a magnetic film for the MSR disc utilizing the FAD and RAD. In the MSR disc using the FAD disclosed in this paper, a GdFeCo read out layer having the thickness of 30 nm and having the Curie temperature of at least 300° C., a TbFeCoAl switching layer having the thickness of 10 nm and the Curie temperature of about 140° C., and a TbFeCo recording layer having the thickness of 40 nm and the Curie temperature of about 250° C. are stacked. In the MSR disc using the RAD, a GdFeCo read out layer having the thickness of 30 nm and the Curie temperature of at least 300° C., a TbFeCoAl subsidiary layer having the thickness of 10 nm and the Curie temperature of about 140° C., a GdFeCo intermediate layer having the thickness of 15 nm and the Curie temperature of about 250° C., and a TbFeCo recording layer having the thickness of 40 nm and the Curie temperature of about 250° C. are provided.

In the magneto-optical disc in which the direction of magnetization of the recording layer is transferred to the reading layer at the time of reading, the transfer characteristic is of critical importance. It is desired that the transfer is performed quickly at a prescribed temperature attained by heating. However, the conventional magneto-optical disc still has a room for improvement in the transfer characteristic. In the conventional magneto-optical disc of the CAD method, there is a possibility of conversion from in-plane magnetization perpendicular magnetization in the reading layer in a relatively wide temperature range of several tens to about 100° C. Such a transfer in a wide temperature range causes much reading noises results in an insufficient MSR effect. The wider the area of the reading layer magnetically influenced by the recording layer at the time of reading, the lower the mask effect, and it becomes more difficult to clearly read the information recorded with high density. In addition, the transfer temperature of the magnetic film much depends on various conditions for forming the film. Therefore, it is relatively difficult to form a magnetic film having a definite threshold value for the transfer with good reproductivity.

In order to heat the recording layer and the reading layer at the time of recording to a temperature not lower than the Curie temperature, conventionally, it was necessary to increase laser power. When heating is not sufficient, a carrier to noise ratio (CNR) of the recording signal is degraded. Further, in order to align the direction of magnetization of the not sufficiently heated reading layer to the direction of the external magnetic field, it is necessary to apply a large magnetic field. In this case also, the CNR of the recording signal is degraded. Further, in magnetic field modulation recording, it is desired that a smaller magnetic field be applied.

When the Curie temperatures of the recording layer is low and the difference between the Curie temperatures of the recording layer and the reading layer is large, sometimes a part of the magnetization of the reading layer prematurely turns to the in-plane direction when the transfer of the direction of magnetization of the reading layer to the recording layer starts during the process of cooling at the time of recording. Such a phenomenon causes noises in the signal to be transferred from the reading layer to the recording layer, degrading the CNR of the recording signal.

In the technique where the state of the recording layer is transferred to the reading layer for reading, it is desired that the temperature distribution of the reading layer heated by the laser spot should have a desired distribution. The reason for this is as follows. When the temperature distribution deviates from the desired distribution, noises caused by random magnetization directions increase, and further, crosstalk noises increase which derive from reading of the state of a portion other than the center of laser spot (that is, a peripheral portion which should have lower temperature). In a transparent type magneto-optical recording medium in which light is transmitted through the magnetic layer, heat accumulation caused by the laser spot irradiation is negligible. Meanwhile, in a magneto-optical recording medium in which the laser beam reflected from a magnetic layer having the thickness of at least 400 Å is detected, the heat accumulation affects the temperature distribution of the reading layer. Therefore, in the reflection type magneto-optical recording medium, the aforementioned noises are increased. Further, in the conventional magneto-optical recording medium, when recording is performed with the medium being irradiated with the laser beam of a constant intensity, the heated area in the recording layer has been larger than the laser spot. As a result, the recording spot becomes larger, making it difficult to increase the density in recording.

When glass is used as the substrate, the following problems are experienced.

a) The magneto-optical recording medium becomes heavy.

b) There is a possibility of breakage when one erroneously drops the medium.

c) The medium cannot withstand a high speed rotation.

d) Surface polishing of the substrate requires much cost.

e) It is difficult to form a guiding groove used for tracking the laser beam directly thereon.

An object of the present invention is to provide a magneto-optical recording medium of the type in which the direction of magnetization of the recording layer is transferred to the reading layer at the time of reading, which has a superior transfer characteristic, and low noises in reading and which attains a high MSR.

Another object of the present invention is to provide a technique for obtaining a magneto-optical recording medium which has a superior transfer characteristic and low reading noises and which can attain a high MSR, with high reproductivity.

A further object of the present invention is to provide a magneto-optical recording medium which allows recording even with a small magnetic field applied and which can be preferably applied to the magnetic field modulation technique.

A still further object of the present invention is to provide a magneto-optical recording medium which is capable of recording with a good CNR and reading with a good CNR.

A still further object of the present invention is to provide a magneto-optical recording medium in which a heat accumulation can be suppressed to a negligible level, and hence noises are reduced.

A still further object of the present invention is to provide a magneto-optical recording medium in which the uniformly heated area in recording and reading can be made smaller, thereby enabling high density recording and reading.

A still further object of the present invention is to provide a magneto-optical recording medium which is easy to handle, on which a guiding groove used for tracking the laser beam can be directly formed and which is relatively inexpensive.

SUMMARY OF THE INVENTION

An aspect of the present invention is directed to a magneto-optical recording medium including a transparent substrate, an underlying layer formed on the transparent substrate, a reading layer essentially consisting of a first magnetic material formed on the underlying layer, and a recording layer essentially consisting of a second magnetic material formed on the reading layer. In the magneto-optical recording medium, the direction of magnetization of the second magnetic material of the recording layer can be transferred to the first magnetic material of the reading layer by heating. Further, in the magneto-optical recording medium, when the Kerr rotation angle $\theta_K$ of the light reflected from the reading layer is measured while the temperatures of the reading and recording layers are increased, the angle $\theta_K$ is approximately proportional to Cth power of the increased temperature t, where C is at least 8.0.

Another aspect of the present invention is directed to a method of manufacturing a magneto-optical recording medium, which includes the steps of forming an underlying layer on a transparent substrate, smoothing the surface of the underlying layer by sputter etching, forming on the smoothed surface a reading layer by depositing a magnetic material which essentially consists of a rare earth element and a transition metal including cobalt with the cobalt content being about 12 at. % to about 50 at. %, and forming a recording layer by depositing a magnetic material on the obtained reading layer. In the step of forming the reading layer, the magnetic material may be deposited by sputtering using sputter gas pressure within the range of about 2 to 7 mTorr. In the step of forming the recording layer, a magnetic material essentially consisting of TbFeCo with the Co content being about 10 at. % to about 16 at. % may be deposited.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are schematic illustrations of Kerr effect.

FIGS. 4A and 4B are schematic diagrams showing principles of the front aperture detection (FAD) and the rear aperture detection (RAD).

DESCRIPTION OF THE PREFERRED EMBODIMENTS

Figure 1:
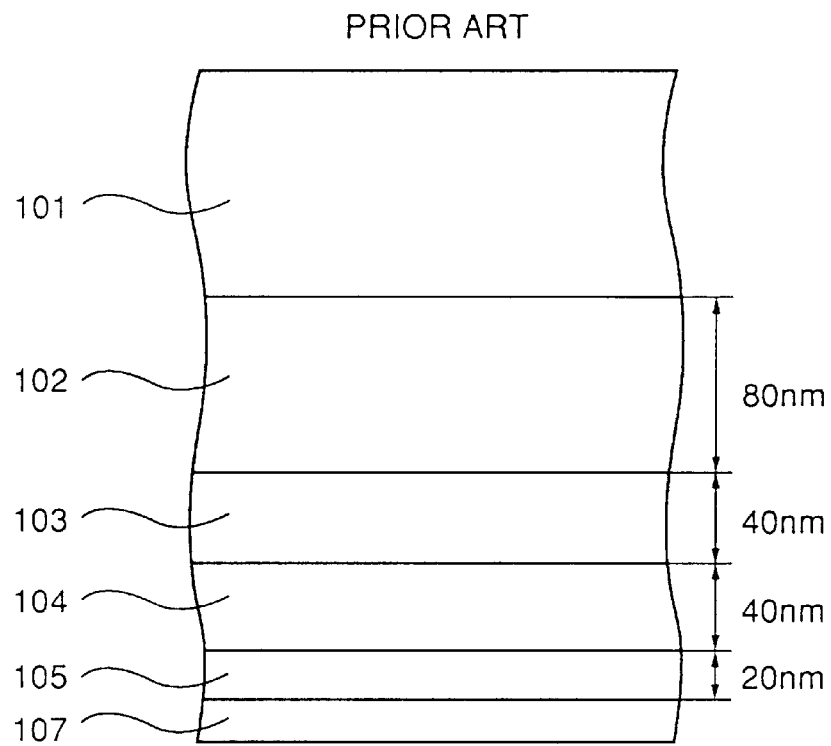
FIG. 1 is a schematic cross section showing the structure of the conventional magneto-optical disc.
Figure 2:
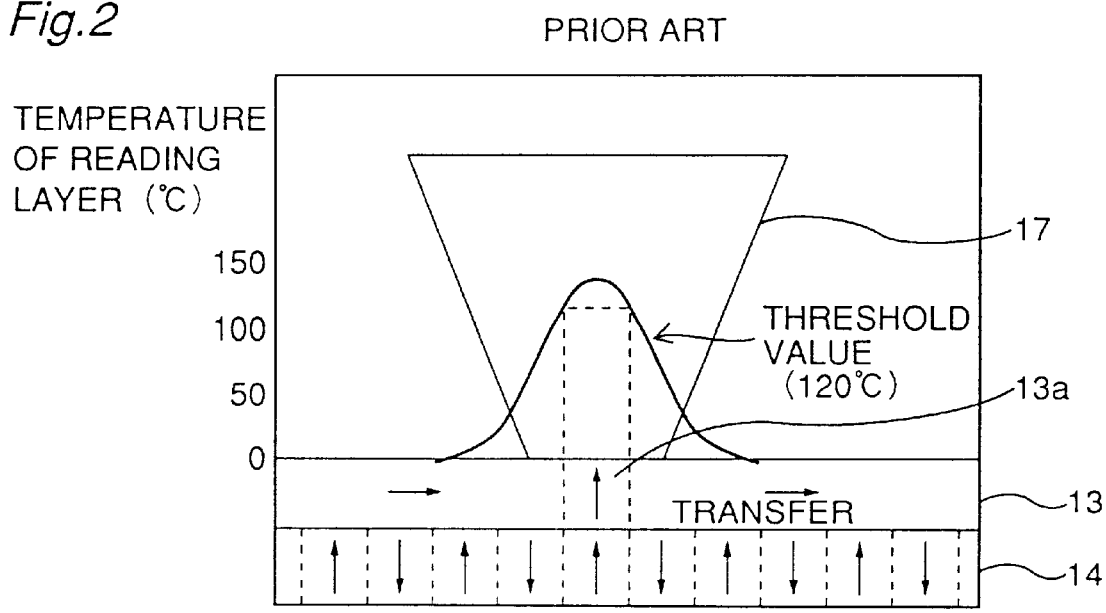
FIG. 2 is a schematic diagram showing a principle of reading of the conventional magneto-optical disc.
Figure 5:
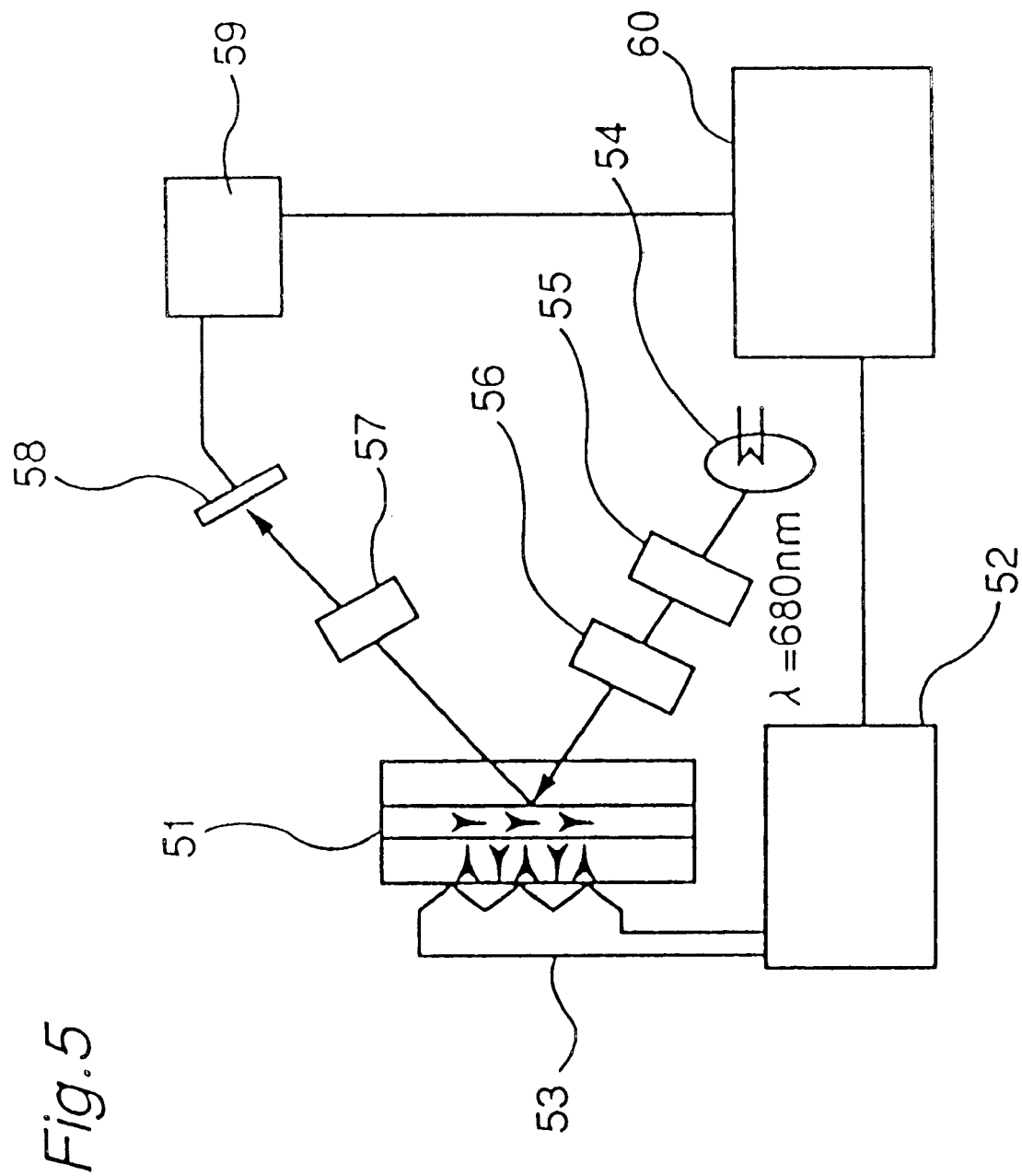
FIG. 5 is a schematic diagram showing a system for measuring the Kerr rotation angle.

In the magneto-optical recording medium in which the direction of magnetization of the recording layer is transferred to the reading layer at the time of reading, the transfer characteristic when the temperature is increased is very important. The inventors attempted to represent the transfer characteristic by numerical values. The transfer characteristic was studied using such a system as shown in FIG. 5. A sample 51 of a disc including recording and reading layers is heated by a heater 53 which is connected to a temperature controller 52. During heating, the reading layer of sample 51 was irradiated with light from a xenon lamp 54 having the wavelength of 680 nm through a monochrometer 55 and a polarizer 56, and light reflected therefrom was detected by a photodetector 58 through an analyzer 57. A signal from the detector was input to a microcomputer 60 through A/D converter 59, and recorded. Information from temperature controller 52 was also input to microcomputer 60 and recorded. When sample 51 is continuously heated, the direction of magnetization of the recording layer is transferred to the reading layer, by the exchange coupling force between the recording and reading layers. When the direction of magnetization of the reading layer changes because of the transfer, the plane of polarization of the reflected light rotates according to Kerr effect. By measuring Kerr rotation angles during heating, the transfer characteristic at the time of heating becomes clear. The inventors found that the following relation approximately held between $\theta_K$ and increase t of the temperature from room temperature, when the Kerr rotation angle $\theta_K$ of the light reflected from the reading layer was measured with the temperatures of the reading and recording layers gradually increased.

$\theta_K t^C$ (C is an arbitrary positive constant)

More specifically, the inventors have found the following experimental equation.

$$\theta_K = (\theta_{KS} - \theta_{Kr})\left(\frac{T - T(room)}{T(\max) - T(room)}\right)^c + \theta_{Kr}$$

Figure 6:
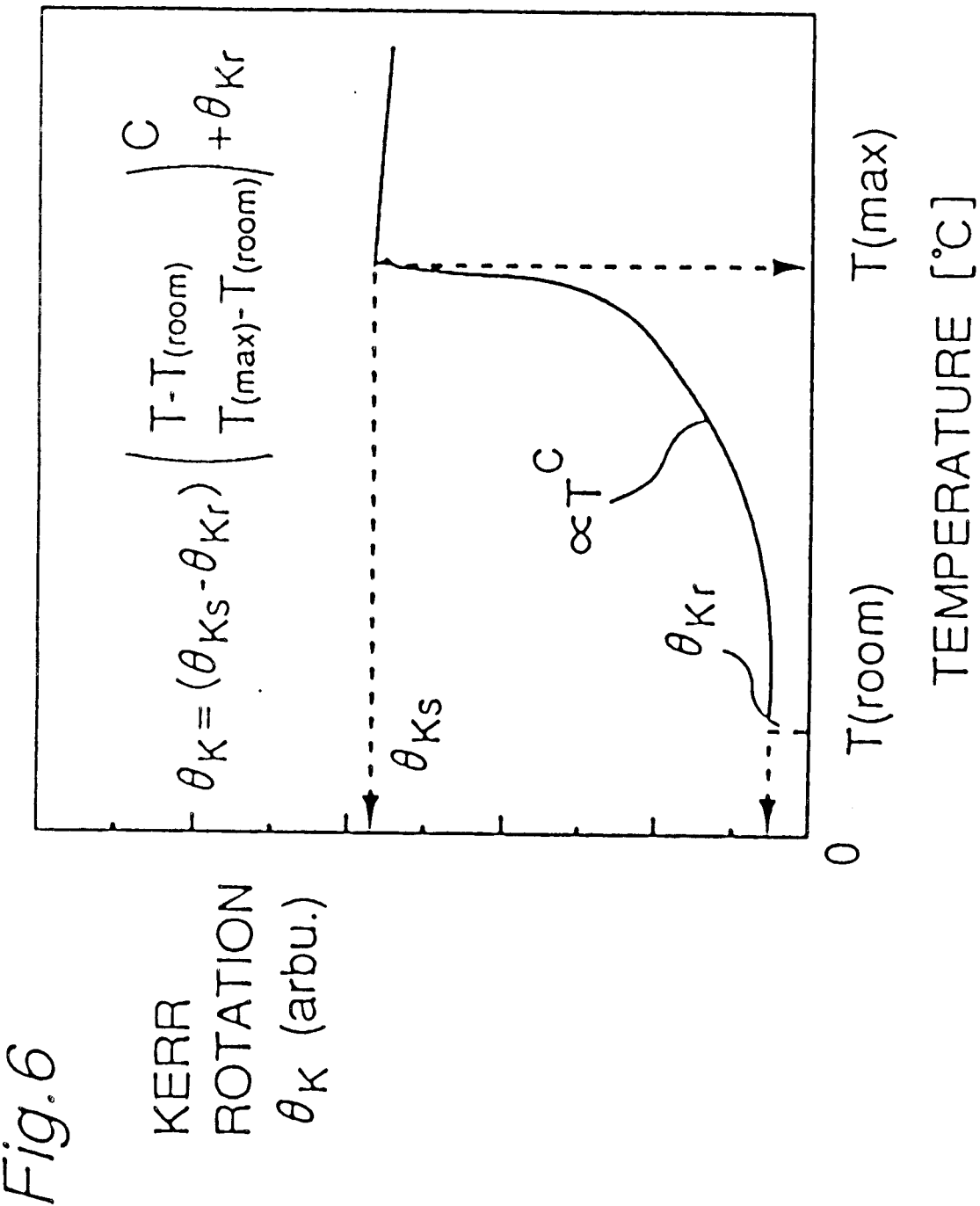
FIG. 6 is a graph showing the relation between the Kerr rotation angle and temperature.

Here, as shown in FIG. 6, T (room) represents room temperature before the start of heating, and T (max) is a temperature where the Kerr rotation angle is maximized by heating. $\theta_{Kr}$ represents a Kerr rotation angle at the temperature T(room), and $\theta_{ks}$ is the maximum value of the Kerr rotation angle attained by heating. As shown in FIG. 6, $\theta_K$-T curve increases exponentially as the temperature increases, and reaches a saturated state. The steeper the curve rises, that is, the larger the constant C, the sooner transfer is completed at a prescribed temperature, which means that the transfer characteristic is satisfactory. Meanwhile, if the rise of the curve is moderate, that is, if the constant C is small, the temperature range where the transfer occurs becomes wider, resulting in a poor transfer characteristic. With such knowledge, it was possible to use the constant C as a parameter for evaluating the transfer characteristic. As a result of various experiments, the inventors found that a magneto-optical recording medium having a good transfer function and reduced reading noises and exhibiting a superior MSR could be obtained by setting the value C to at least about 8, preferably at least about 9 and more preferably at least about 10, in accordance with the following conditions for example. Meanwhile, the value C of the conventional disc was significantly smaller than 8. The value C of at least about 8 was obtained under any of the following conditions, as a result of experiments.

(1) By setting the content of Co in the reading layer within the range of about 12 at. % to about 50 at. %, for example, preferably at about 20 at. %.

(2) By setting the film thickness of the reading layer within the range of about 800 Å to about 1200 Å, for example, preferably about 1000 Å.

(3) By forming the reading layer on the underlying layer which is smoothed by etching.

(4) When the reading layer is formed by sputtering, by setting the sputtering gas pressure within the range of about 2 to about 7 mTorr, for example, preferably about 3 to 5 mTorr.

By measuring the value C of the magnete-optical recording medium, the performance, especially noises in reading and the MSR effect can be evaluated. If the value C is larger than 8, that means that, basically, satisfactory performance can be obtained. Further, if the value C is larger than 8, recording and reading at a higher density is possible.

In accordance with the present invention, a medium in which the recording layer is in the state of perpendicular magnetization at room temperature and the reading layer is in the state of in-plane magnetization can be provided. As will be described later, when the recording layer is formed of a material which can be an antiferromagnetic at room temperature and which can be converted from the antiferromagnetic to a ferromagnetic by heating, either an in-plane magnetization film or a perpendicular magnetization film may be used as the reading layer.

In the present invention, preferably, the reading layer essentially consists of a transition metal including cobalt and a rare earth element, with the cobalt content in the reading layer being, preferably, in the range of about 12 at. % to about 50 at. %, and more preferably, about 12 at. % to about 30 at. %. Especially, it is preferred that the reading layer essentially consists of Gd, Fe and Co, with the Co content in the reading layer preferably being in the range of about 12 at. % to about 50 at. %, and more preferably about 12 at. % to about 30 at. %. The reading layer may contain, other than these metal elements, a metal element such as Cr, Ni, Ti, Al or Mn, so long as the property is maintained. When the cobalt content in the reading layer is set in the range of about 12 at. % to about 30 at. %, the Curie temperature of the reading layer tends to be in the range of about 230° C. to about 350° C., and hence heating becomes possible with relatively small laser power. Therefore, even when the externally applied magnetic field is small, a good recording CNR is obtained. Such a medium enables optimal magnetic field modulation recording. As recording is possible with only a small magnetic field externally applied, the scale of the recording apparatus can be reduced. Further, a CNR at the time of reading in such a medium was satisfactory. This effect was more improved by forming the reading layer on the underlying layer which was smoothed by etching. Further, by setting the Co content in the reading layer within the range of about 12 at. % to about 50 at. %, preferably about 12 at. % to about 30 at. %, the aforementioned $\theta_K$-T curve can be made steep, and a good transfer characteristic can be obtained. Further, it is preferable that the reading layer essentially consists of GdFeCo with the Gd content being the range of about 30 at. % to about 36 at. %, and the Co content being in the range of about 12 at. % to about 50 at. %, preferably about 12 at. % to about 30 at. %. When the content of Gd is in the range of about 30 at. % to about 36 at. %, the CNR of the reading signal can be improved. Preferably, the thickness of the reading layer is in the range of about 800 Å to about 1200 Å. With the thickness being in this range, the CNR of the reading signal can be improved. Further, the thickness in this range can make steep $\theta_K$-T curve and improves the transfer characteristic.

The reading layer can be prepared by a common film forming technique such as sputtering. When the reading layer is formed by sputtering such as DC magnetron sputtering, a preferabe range of the sputter gas pressure is 2 mTorr to 7 mTorr. More preferably, the pressure is in the range of 3 mTorr to 5 mTorr. When the reading layer is formed with the gas pressure being in this range, a magnetic film having a superior transfer characteristic can be obtained.

In the present invention, it is preferable that the recording layer essentially consists of TbFeCo with the Co content being in the range of about 10 at. % to about 16.at %. When the Co content of the recording layer is set within this range, lowering of the CNR caused by a lower laser power can be significantly suppressed. Further, by combining the reading layer of which the Co content is about 12 at. % to about 50 at. %, preferably about 12 at. % to about 30 at. % and the recording layer essentially consisting of TbFeCo of which the Co content is in the range of about 10 at. % to about 16.at % are combined, the difference in Curie temperatures of the reading and recording layers can be significantly reduced. In this case, when the direction of magnetization is transferred from the reading layer to the recording layer at the time of recording, the reading layer is magnetized in the perpendicular direction, and premature change of the part of magnetization to the in-plane direction is prevented effectively. Therefore, magnetization in the in-plane direction causing noises can be prevented, and as a result, a good CNR can be obtained. The thickness of the recording layer may be set to about 300 Å to about 600 Å. The recording layer can also be prepared by using common film forming techniques such as sputtering.

Meanwhile, in the present invention, the recording layer may essentially consist of a material which can be an antiferromagnetic at room temperature and which can be converted from the antiferromagnetic to a ferromagnetic by heating. In such a magnetic material, the primary converting temperature from the antiferromagnetic to the ferromagnetic is preferably at least 50° C. As such a material, the substance represented by the following formula may be used.

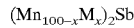

$(Mn_{100-x}M_x)_2Sb$ the values in the parenthesis represented in percentage, wherein M is selected from the group consisting of Cr, V, Co, Cu, Zn, Ge and As, and X is 0 to 100. Especially, a magnetic material in accordance with the above formula with M being Cr and X being from 10 to 30 is preferable. In the recording layer formed of such a material, magnetic moments are arranged antiparallel so as to cancel each other at room temperature, and there is no spontaneous magnetization. Therefore, at room temperature, there is no magnetic influence from the recording layer to the reading layer, and in-plane magnetization in the reading layer is kept more stably. Such a medium exhibits a superior mask effect and an MSR effect. Further, the recording layer turns to a ferromagnetic at a prescribed temperature depending on the composition of the material. The direction of magnetization of the ferromagnetic corresponds to the direction of magnetization at the time of recording. Since information in the recording layer is not unmasked until heated, a sharper transfer can be obtained when the temperature is increased. Therefore, reading with low noises and a high MSR effect become possible. When such a magnetic material is used, a perpendicular magnetization film may be used other than the in-plane magnetization film, as the reading film. In that case, the direction of magnetization of the reading layer is aligned at the time of initialization. Thereafter, when the reading and recording layers are heated by the laser beam, the direction of magnetization of the reading layer is inverted to the same direction as the direction of magnetization of the recording layer, at a high temperature area exceeding the threshold value temperature. This inversion occurs quickly only at the high temperature area. Therefore, a superior transfer characteristic is obtained, and the value C that is the parameter representing the transfer characteristic is increased close to infinite. By using an antiferromagnetic as the recording layer, the transfer temperature of magnetization can be more clearly defined, and a magnetic film having prescribed quality can readily be prepared. Therefore, necessary cost for manufacturing the medium can be reduced.

In the present invention, an SiN film which functions as an interference layer is preferably used as the underlying layer. Preferably, the thickness of the SiN film is in the range of about 600 Å to about 800 Å. The thickness within this range contributes to improve a recording characteristic. Further, the surface of the underlying layer on the side of the reading layer is prepferably smoothed by etching. The surface roughness Rmax on the side of the reading layer should preferably be about 10 nm or smaller. When the reading layer and the recording layer are formed on the surface of the underlying layer which is smoothed by etching, recording becomes possible with a lower magnetic field applied externally, and a CNR at the time of reading can be improved. Further, smoothing the surface of the underlying layer makes the $\theta_K$-T curve steep, resulting in an improved transfer characteristic. This leads to lower noises at the time of reading and a superior MSR.

The present invention may further include a heat diffusion layer formed on the recording layer. The heat diffusion layer may essentially consist of at least one selected from the group consisting of Al, Au, Pt, Ti, V, Cr, Mn, Fe, Co, Mi, Cu, Zn, Mo, Ag, Sn, Sb and W. The thickness of the heat diffusion layer is preferably in the range of about 200 Å to about 1000 Å. The heat diffusion layer lets the heat of the exchange coupling magnetic layer off, so that temperature distribution of the reading layer comes to have a desired pattern. Therefore, noises caused by the random directions of magnetization and crosstalk noises caused by undesirable reading of the states at a portion other than the center of the laser spot (peripheral portion which should be at a lower temperature) can be reduced. Further, since a heat diffusion layer is provided on the recording layer, the uniformly heated area at the time of laser irradiation for recording and reading can be made narrower, whereby recording and reading at higher density become possible.

In the present invention, a substrate essentially consisting of polycarbonate resin is preferably used as the transparent substrate. In the polycarbonate substrate, preferably, the value Δnd with respect to birefringence is in the range of about 20 to about 25 nm, fluctuation of birefringence in the circumferential direction is about 6 to about 10 nm, and the radii of curvature at the corners of a groove and a land are in the range of about 35 to about 50 nm. Further, surface roughness Rmax of the polycarbonate substrate is preferably in the range of about 100 to about 500 Å. The medium using polycarbonate substrate is not susceptible to breakage, and handling is easy.

In the magneto-optical recording medium in accordance with the present invention, recording may be performed with the externally applied magnetic field being in the range of about 50 to about 2000 Oe. Such a magnetic field is considerably smaller than the magnetic field conventionally used. Further, at the time of recording, a laser pulse of which duty is about 20% to about 60% may be used, and phase difference between the pulsed magnetic field and the laser pulse may be set to 0 to about 60 nsec. As the laser beam at the time of recording is pulsed, the area uniformly heated by the laser irradiation can be made narrower, enabling highly densed recording. Further, when the medium recorded under the above described condition is read, at the reading linear velocities of about 1.1 to about 1.3 m/sec, about 1.5 to about 1.7 m/sec, about 1.9 to about 2.1 m/sec, about 2.9 to about 3.1 m/sec, about 4.9 to about 5.1 m/sec and about 8.9 to about 9.1 m/sec, reading powers of about 1.5 to about 2.2 mW, about 1.8 to about 2.7 mW, about 2.0 to about 3.0 mW, about 2.4 to about 3.7 mW, about 3.2 to about 4.5 mW and about 4.0 to about 6.0 mW may be set, respectively.

In the manufacturing method in accordance with the present invention, the underlying layer is formed on the transparent substrate. The aforementioned SiN film is preferably prepared as the underlaying layer. The surface of the obtained underlying layer is preferably smoothed by sputter etching, for example. The smoothed surface roughness Rmax should preferably be at most 10 nm. The etching power for smoothing is preferably in the range of about 0.02 W/cm$^2$ to about 0.08 W/cm$^2$, for example. Thereafter, on the surface of the underlying layer, a reading layer may be formed by depositing a magnetic material which essentially consists of a transition metal including cobalt and a rare earth element with the cobalt content being in the range of about 12 at. % to about 50 at. %, preferably, about 12 at. % to about 30 at. %. When the magnetic material is deposited by sputtering, a sputter gas pressure in the range of about 2 to 7 mTorr is preferred. Further, a GdFeCo film with the Gd content being about 30 at. % to about 36 at. % is preferably formed as the reading layer. A recording layer may be formed by depositing a magnetic material essentially consisting of TbFeCo of which the Co content is about 10 at. % to about 16 at. %, on the obtained reading layer.

EXAMPLES

Example 1

Figure 7:
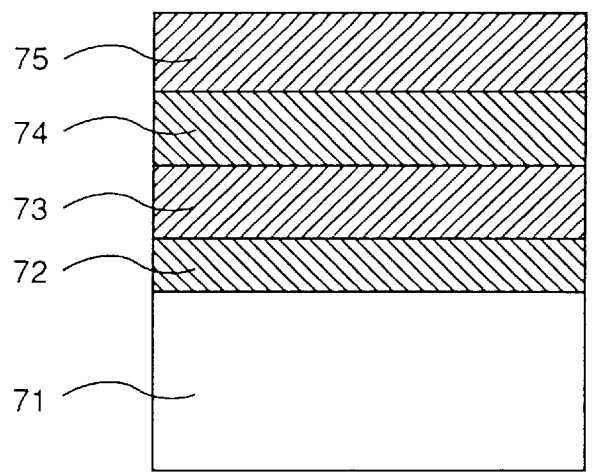
FIG. 7 is a cross section schematically showing a magneto-optical recording medium in accordance with Example 1 of the present invention.

A CAD-MSR medium having such a structure as shown in FIG. 7 was prepared. In the medium, on a glass substrate 71, an SiN underlying layer 72, a GdFeCo reading layer 73, a TbFeCo recording layer 74 and an SiN protective layer were deposited in this order. The recording layer was prepared by dc magnetron co-sputtering, using Gd and FeCo alloy targets. The recording layer was prepared by dc magnetron sputtering using a TbFeCo alloy target. The SiN layer was prepared by rf-sputtering, using an SiN target. In this example, the underlying layer (interference layer) of 800 Å, the reading layer of 500 Å, the recording layer of 500 Å and the protective layer of 800 Å were formed. The composition of the recording layer was $Gd_{31}Fe_{46}Co_{23}$, and the composition of the recording layer was $Td_{26}Fe_{66}Co_8$.

Example 2

A medium was prepared in the similar manner as Example 1 except that after the interference layer was formed, the surface thereof was etched, and then the reading layer was formed. As for the etching condition, the reverse sputtering pressure was 1.2 mTorr, the applied power was 100 W and the time period for etching was 20 minutes.

Example 3

A medium was prepared in the similar manner as Example 1, except that the thickness of the interference layer was 700 Å.

Example 4

A medium was prepared in the similar manner as Example 3 except that the thickness of the reading layer was 1000 Å.

Example 5

A medium was prepared in the similar manner as Example 4 except that the composition of the recording layer was $Tb_{25}Fe_{62}Co_{13}$.

Example 6

A medium was prepared in the similar manner as Example 5 except that the composition of the reading layer was $Gd_{34}Fe_{44}Co_{22}$.

Example 7

A medium was prepared in the similar manner as Example 6 except that after the interference layer was formed, the surface thereof was etched and thereafter the reading layer was formed thereon. Etching power was 0.05 W/cm$^2$.

Example 8

On the protective layer of the medium obtained in Example 7, an Al heat diffusion layer having the thickness of 200 Å was formed.

Example 9

A medium was prepared in the similar manner as Example 6. However, in Example 6, the sputter gas pressure at the time of forming the reading layer was 7 mTorr, while in Example 9, the sputter gas pressure at the time of forming the reading layer was 3.5 mTorr.

Comparative Example 1

A medium was formed in the similar manner as Example 1 except that the composition of the reading layer was $Gd_{23}Fe_{65.5}Co_{11.5}$.

Figure 8:
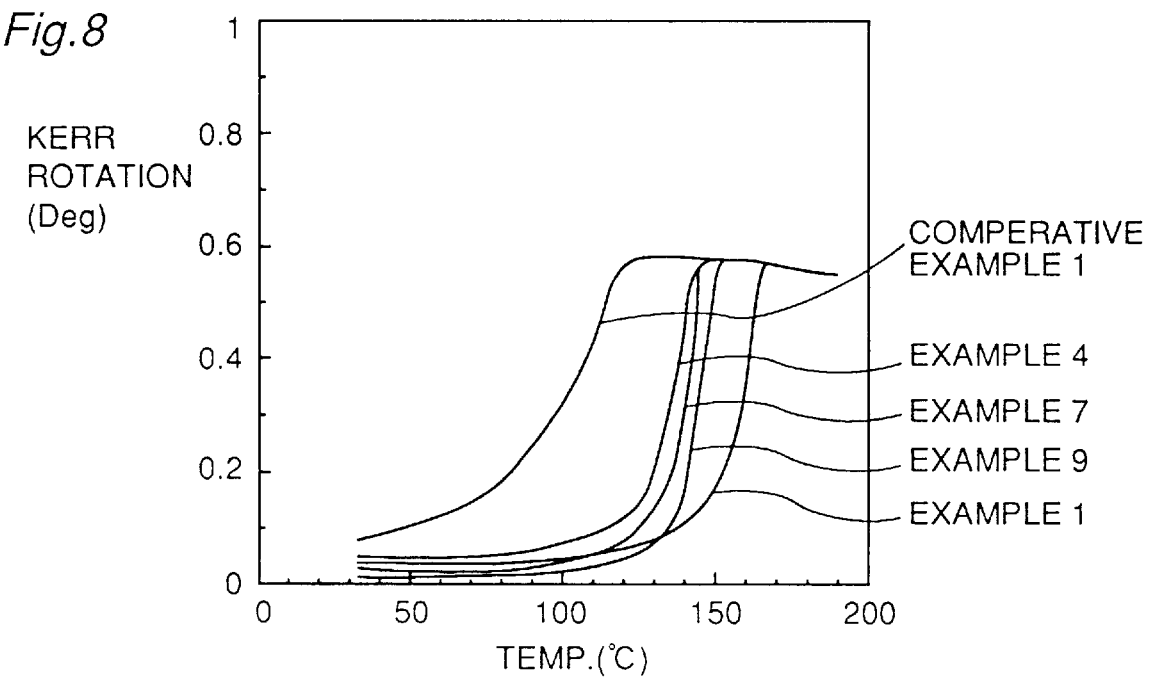
FIG. 8 is a graph showing the relation between the Kerr rotation angle and the temperature of the medium obtained in accordance with the present invention and of an exemplary medium for comparison.

FIG. 8 shows $\theta_T$ curves of the magneto-optical recording media obtained in accordance with Examples 1, 4, 7 and 9 and Comparative Example 1. Each curve arises exponentially, and the value $\theta_K$ is approximately in proportion to Cth power of the temperature t increased from room temperature. The value C was calculated for each curve, which was 8.99 in Example 4, 9.69 in Example 7, 10.9 in Example 9 and 11.0 in Example 1. The value C of Comparative Example 1 was 2.4. From these results, it was found that the value C could be increased by setting the Co content of the reading layer to about 20 at. %, by setting the thickness of the reading layer to about 1000 Å, by setting the sputtering gas pressure used at the time of forming the reading layer to about 3.5 mTorr or by forming the reading layer on the underlying layer which was smoothed by etching, resulting in a good transfer characteristic.

Figure 9:
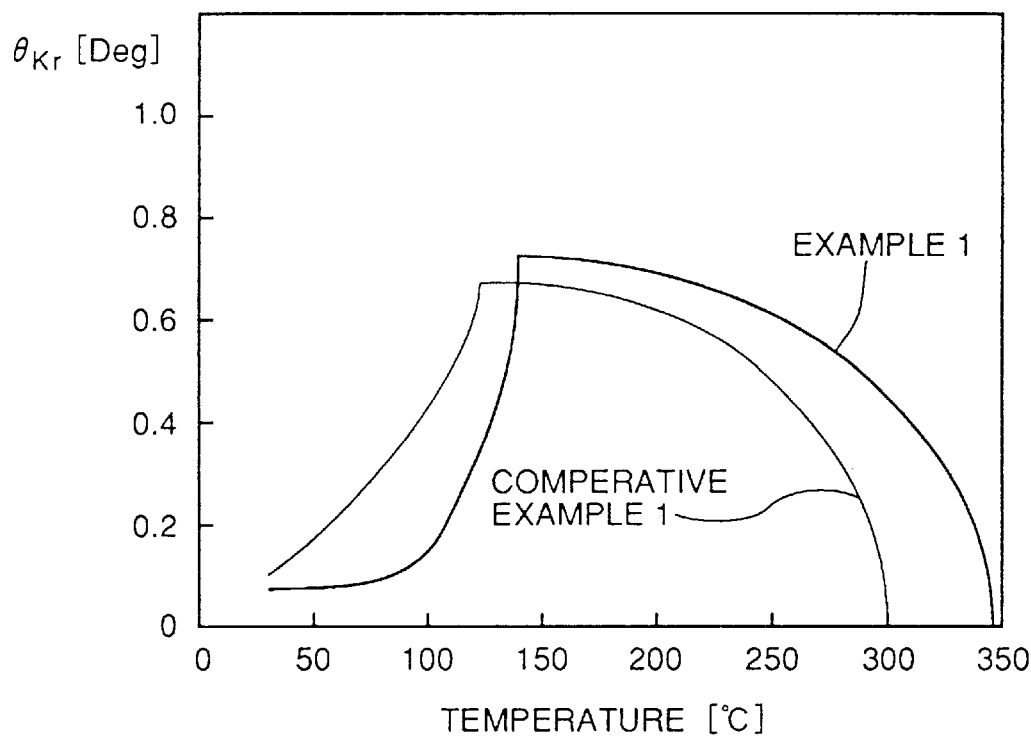
FIG. 9 is a graph showing the relation between the Kerr rotation angle and the temperatures of Example 1 and Comparative Example 1.

FIG. 9 shows temperature characteristics of Kerr rotation angles of Comparative Example 1 and Example 1. The temperature (transfer temperature) at which the reading layer of the magneto-optical recording medium of Example 1 turns to a perpendicular magnetization film was 140° C., and Curie temperature was 350° C. By contrast, Curie temperature of Comparative Example 1 was 300° C. When laser spot is introduced through the substrate and the reading layer is heated to the transfer temperature, at a portion where the temperature exceeds the transfer temperature (140° C. in Example 1), the direction of magnetization of the recording layer is transferred to the reading layer.

Figure 10:
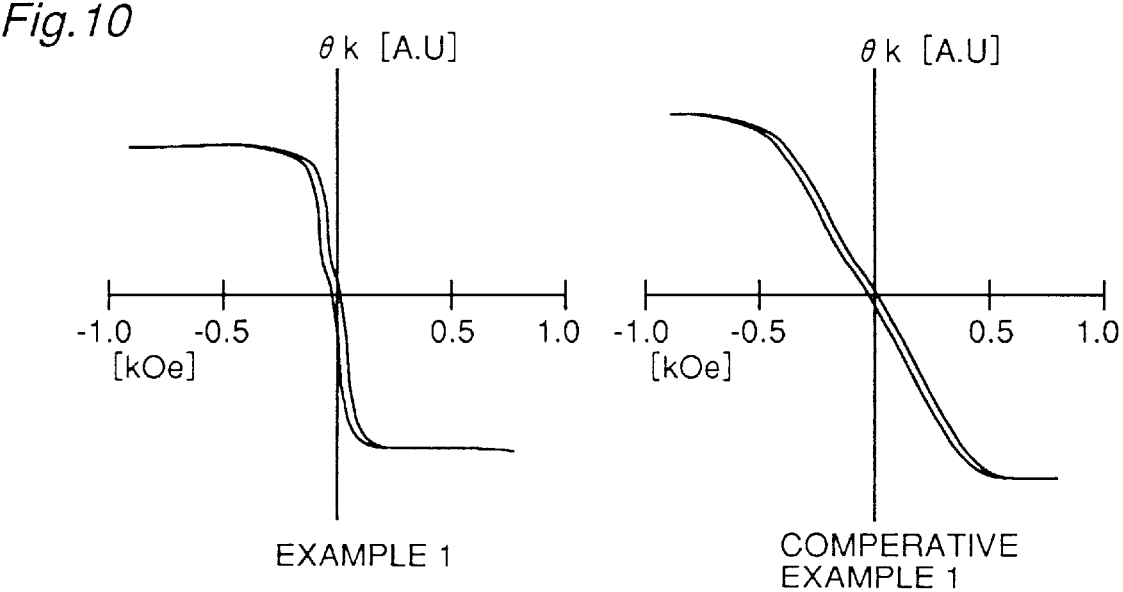
FIG. 10 is a graph showing Kerr loops near the Curie temperatures of Example 1 and Comparative Example 1.

FIG. 10 shows Kerr loops near the Curie temperatures of Example 1 and Comparative Example 1, respectively. As shown in the figure, the saturation magnetic field at the temperature of 280° C. in the Comparative Example was about 500 Oe, and the saturation magnetic field at a temperature of 330° C. in Example 1 was about 1000 Oe. The magnitude of saturation magnetic field at a temperature slightly lower than Curie temperature (330° C. in Example 1, 280° C. in Comparative Example) is related to the magnitude of the magnetic field applied externally, which is necessary at the time of recording. More specifically, the larger the saturation magnetic field, the larger the externally applied magnetic field necessary for recording.

Figure 11:
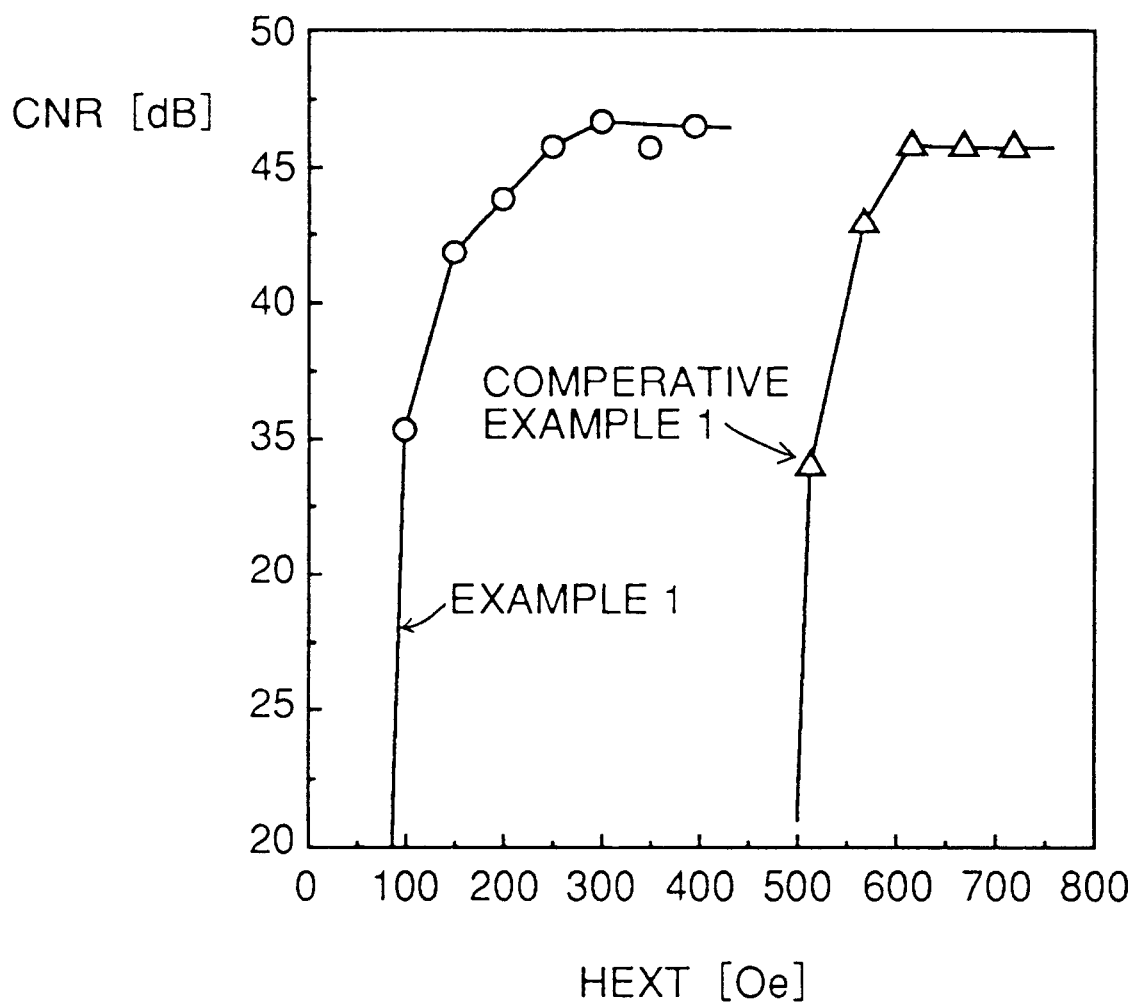
FIG. 11 is a graph showing a recording characteristic in magnetic field modulation a recording of Example 1 and Comparative Example 1.

FIG. 11 shows magnetic field modulation recording characteristics of Example 1 and Comparative Example 1. As shown in the figure, in the Comparative Example, recording was not possible unless an external magnetic field of at least 500 Oe was applied. By contrast, in Example 1, the CNR could be saturated with the externally applied magnetic field being about ±200 Oe. Further, recording was possible with the externally applied magnetic field being as low as about ±80 Oe.

In Example 1, when the Co composition ratio in the reading layer was made larger than 50 at. %, it did not turn to the perpendicular magnetization film even when the temperature was raised, and the object of the present invention could not be attained. In Example 1, the reading layer was formed by GdFeCo. However, similar effects as in Example 1 could be obtained when the reading layer was formed by using other elements, for example four element materials such as GdFeCoCr, GdFeCoNi, GdFeCoTi, GdFeCoAl and GdFeCoMn, or by five element materials such as GdFeCoNiCr and GdFeCoAlTi.

Figure 12A:
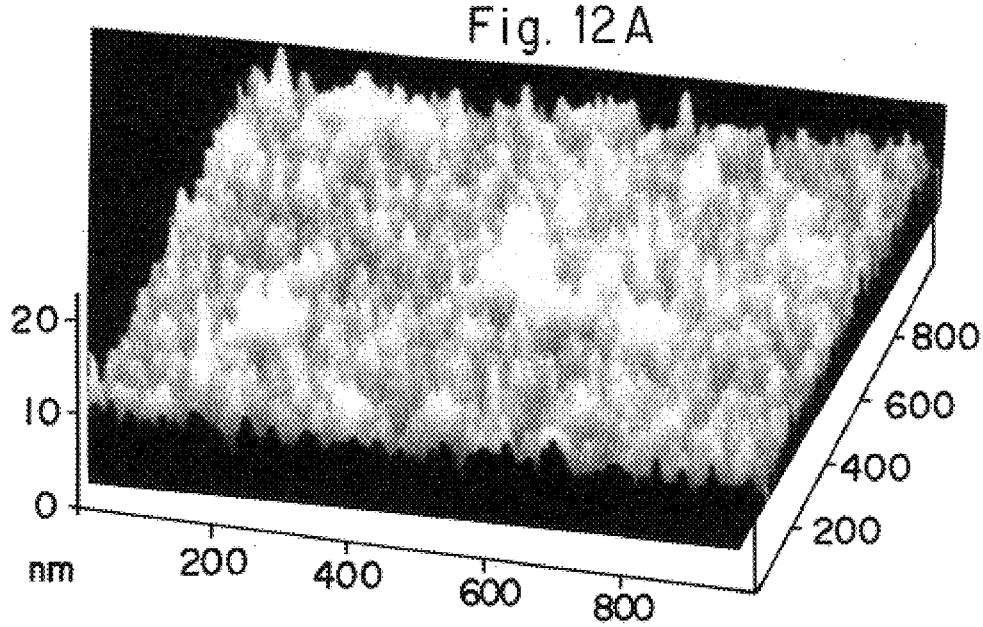
FIG. 12 is a chart showing results of observation by an atomic force microscopy, of interference layers prepared in Examples 1 and 2.
Figure 12B:
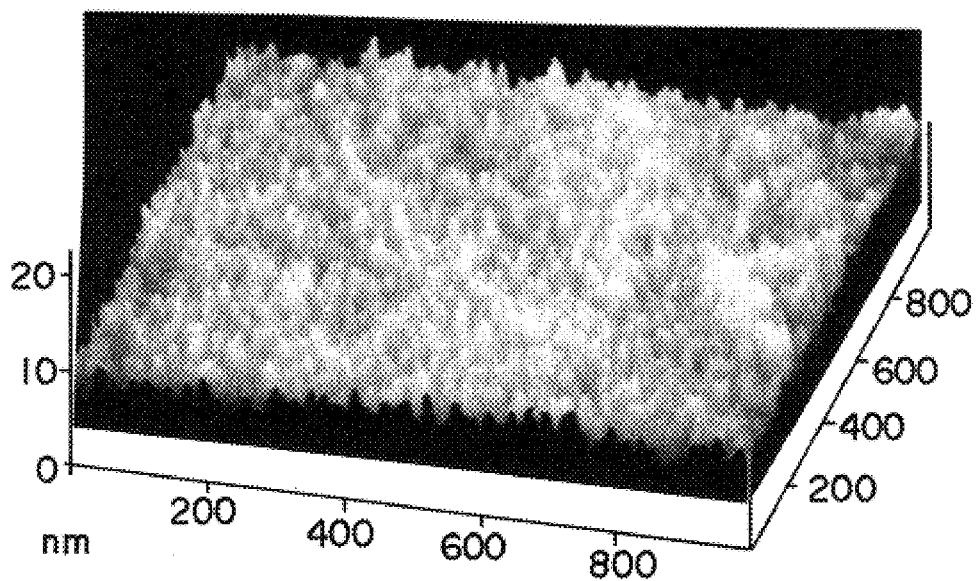

FIG. 12 includes images observed by atomic force microscopy of the surfaces of the interference layers (underlying layers) formed in Examples 1 and 2. In Example 2, it is recognized that the surface of the interference layer is made planar than Example 1. Therefore, pinning force between the recording layer and the reading layer formed on the surface smoothed by etching utilizing reverse sputtering becomes lower, so as to facilitate the movement of the magnetic walls.

Figure 13:
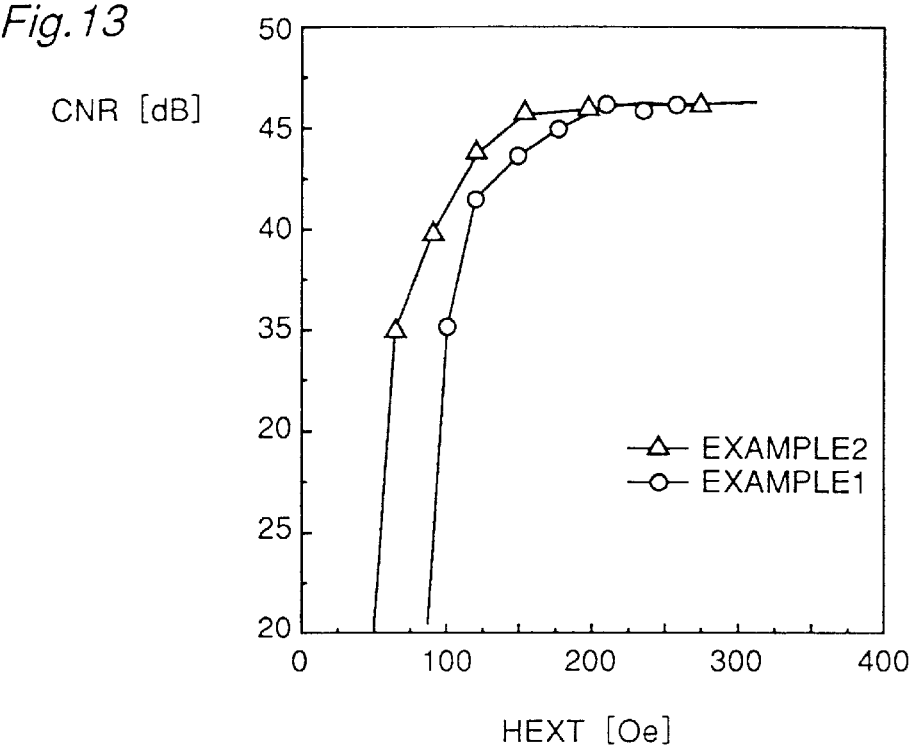
FIG. 13 is a graph showing a recording characteristic of magnetic modulation recording of Examples 1 and 2.

FIG. 13 shows magnetic field modulation recording characteristics (the CNRs of the reading signal with respect to the externally applied magnetic field) of Examples 1 and 2. As shown in the figure, in Example 1, recording is possible with the externally applied magnetic field being about ±80 Oe. In Example 2, recording is possible with even lower externally applied magnetic field of ±50 Oe. This may be caused by the effect of forming the reading layer after the surface of the underlying layer is smoothed by etching.

Figure 14:
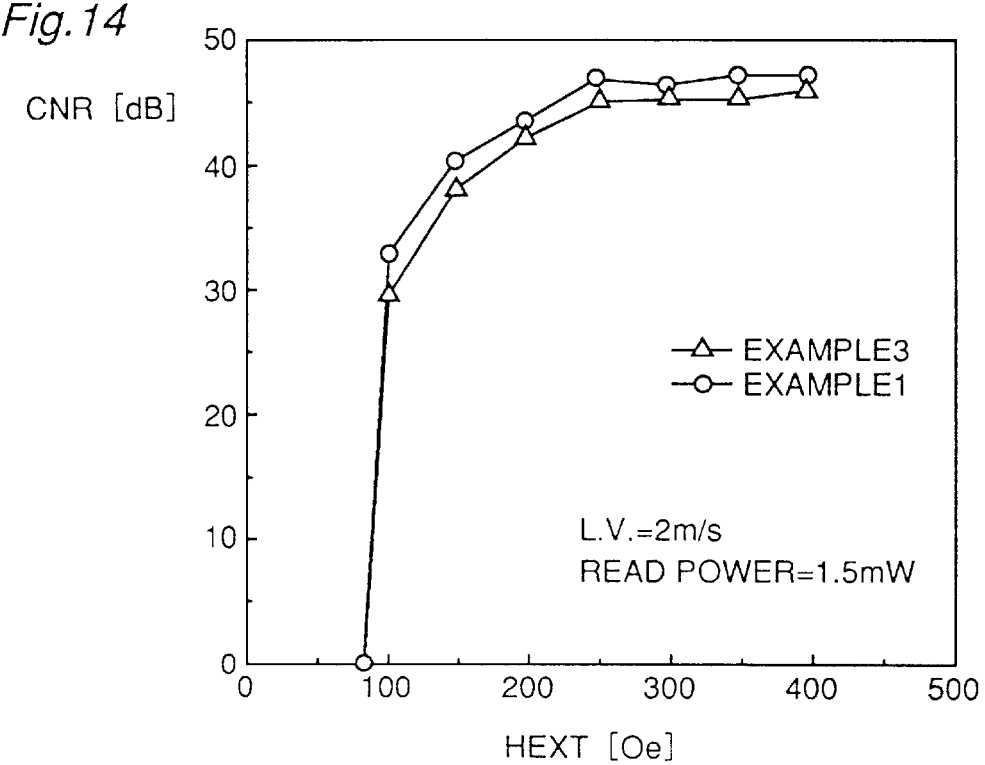
FIG. 14 is a graph showing CNRs of the read signals with respect to externally applied magnetic field, of Examples 1 and 3.

FIG. 14 shows magnetic field modulation recording characteristics (the CNRs of the reading signal with respect to the externally applied magnetic field) of Examples 1 and 3. As shown in the figure, in Example 3, recording is possible with the externally applied magnetic field of about ±80 Oe as in Example 1, and in addition, the recording characteristic is further improved. This may be caused by the effect obtained by making the interference layer slightly thinner than Example 1. It was recognized that a good characteristic is obtained with the thickness of the interference layer being in the range of 600 Å to 800 Å.

Figure 15:
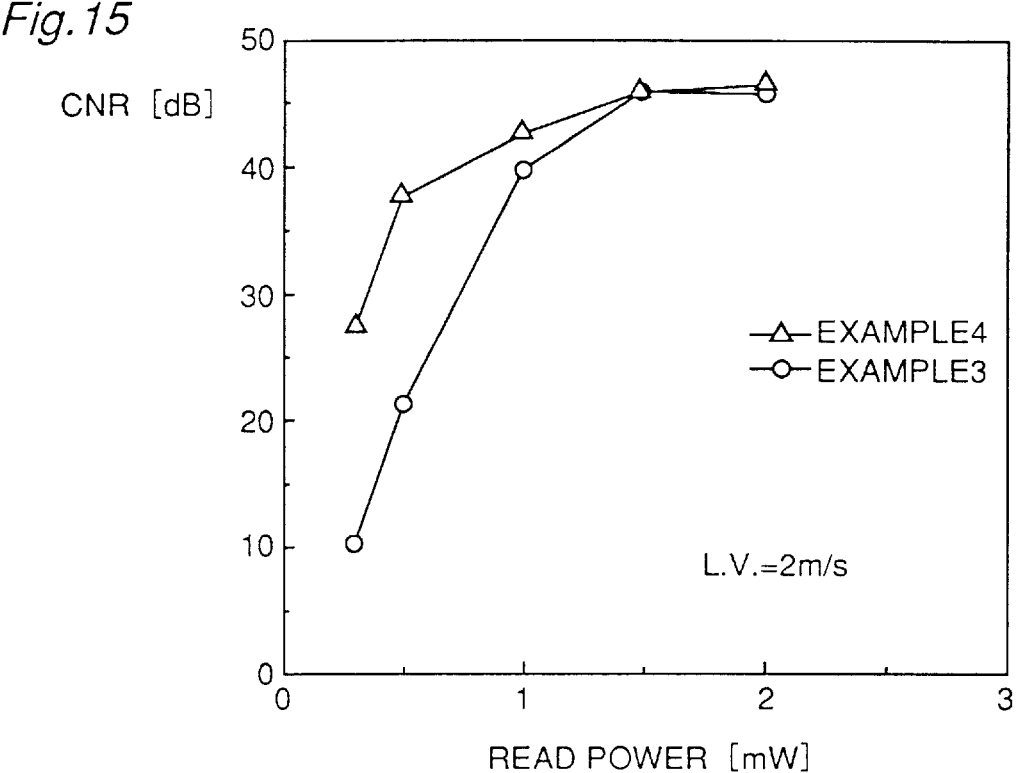
FIG. 15 is a graph showing CNRs of the read signals with respect to reading laser power of Examples 3 and 4.

FIG. 15 shows reading characteristics (the CNRs of reading signal with respect to reading laser power) of Examples 3 and 4. As shown in the figure, near the laser power of 1.5 mW for reading, the CNR changes abruptly in Example 4, which may be the effect that the film thickness was set to 1000 Å, thicker than in Example 3. The effect that the CNR of the reading signal changes abruptly at a certain value of the laser power at the time of reading as a border (near 1.5 mW in Example 4) is ensured when the thickness of the reading layer was set in the range of 800 Å to 1200 Å.

Figure 16:
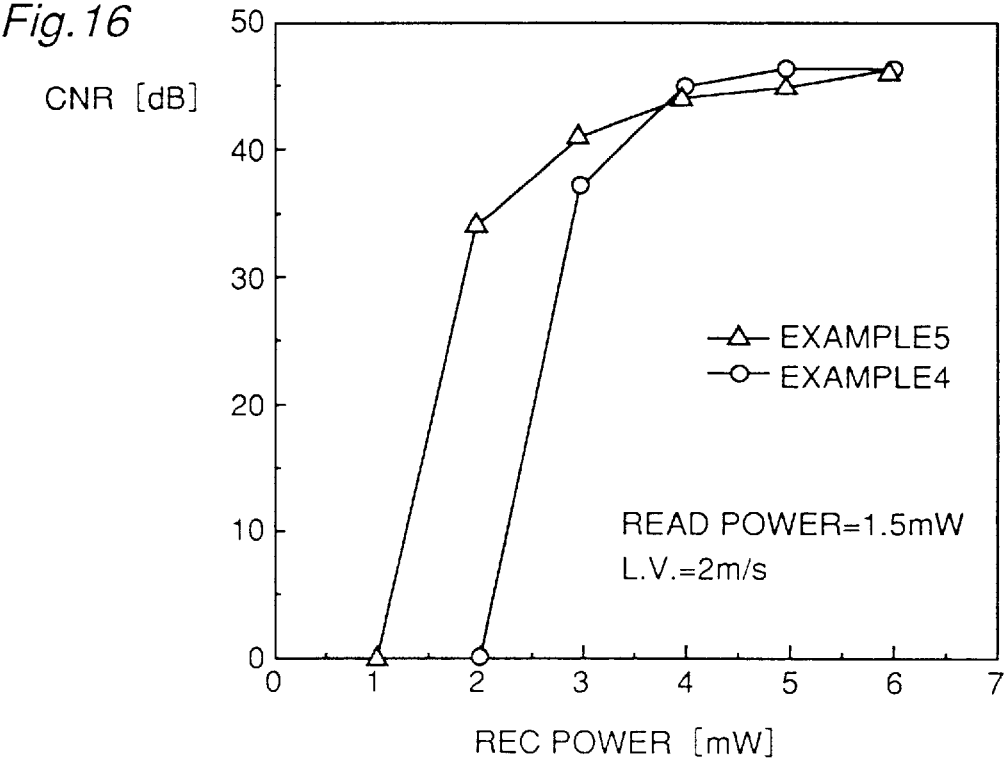
FIG. 16 is a graph showing CNRs of the read signals with respect to recording laser power of Examples 4 and 5.

FIG. 16 shows recording characteristics (the CNRs of the reading signal with respect to recording laser power) of Examples 4 and 5, with the laser power at the time of reading being 1.5 mW. As shown in the figure, in Example 5 in which the Co content in the recording layer is varied, the CNR of the reading signal lowers significantly when the laser power of the recording signal becomes lower than 3 mW (>>1.5 mW=reading laser power). By contrast, in Example 4, the CNR of the reading signal does not lower significantly until the laser power of the recording signal becomes lower than 2 mW (>1.5 mW=reading laser power). In other words, there is smaller possibility that already recorded signals are affected by the irradiation of laser power for reading in Example 5 than in Example 4. This may be the effect obtained by setting the content of Co of the recording layer larger in Example 5 than in Example 4. It is confirmed that such an effect is sufficiently obtained when the Co content of the recording layer is set in the range of 10 at. % to 16 at. %.

Figure 17:
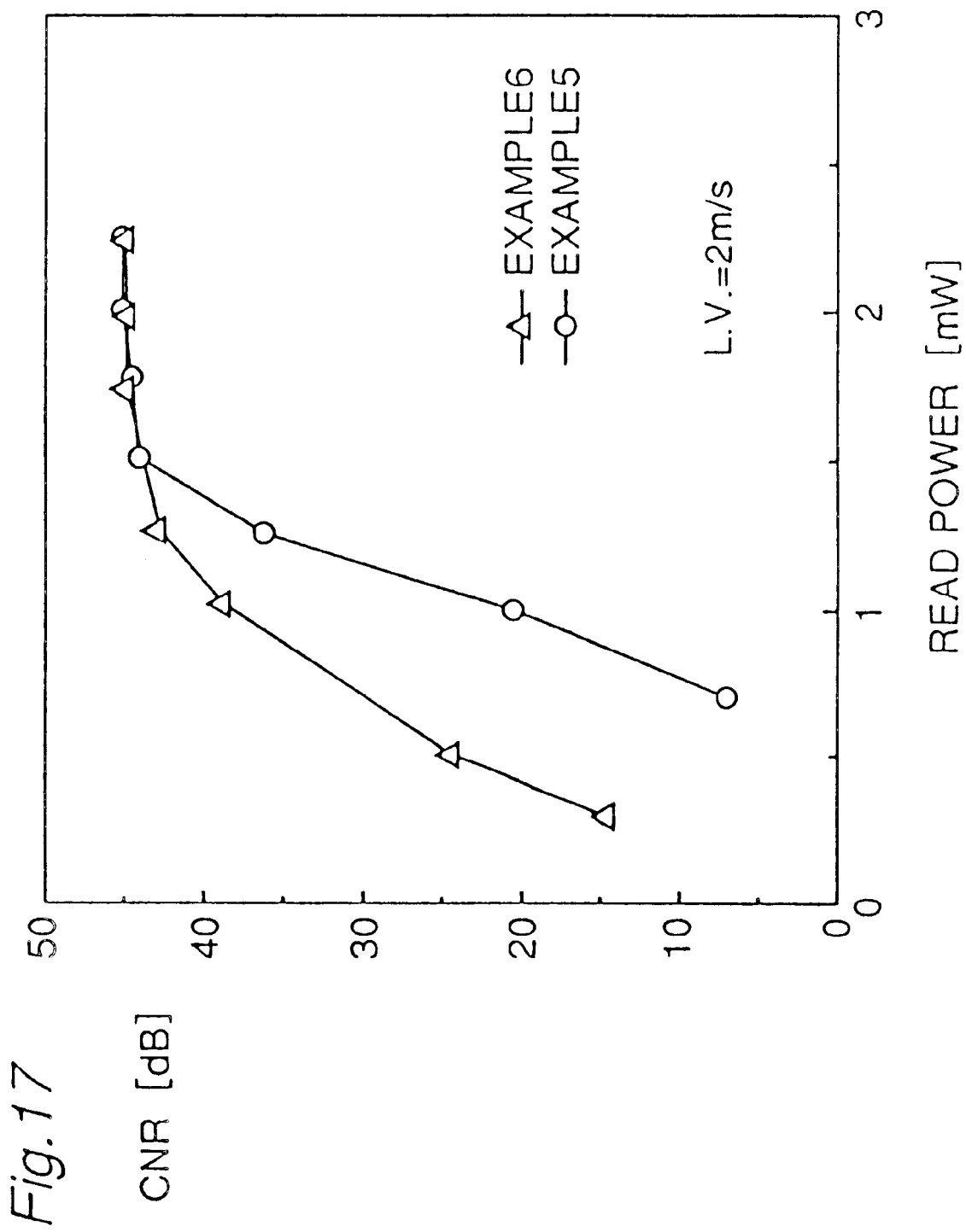
FIG. 17 is a graph showing CNRs of the read signals with respect to reading laser power of Examples 5 and 6.

FIG. 17 shows reading characteristics (the CNRs of reading signal with respect to reading laser power) of Examples 5 and 6. As shown in the figure, with the laser power of 1.5 mW for reading being a boundary, the CNR changes abruptly in Example 6, exhibiting a better characteristic than Example 5. This may be the effect provided by setting the Gd content of the reading layer to 34 at. %, which is larger than Example 5. The effect that the CNR of the reading signal changes abruptly with a certain value of the laser power for reading being a boundary (near 1.5 mW in Example 6) is ensured when the Gd content of the reading layer is set in the range of 30 at. % to 36 at. %.

Figure 18:
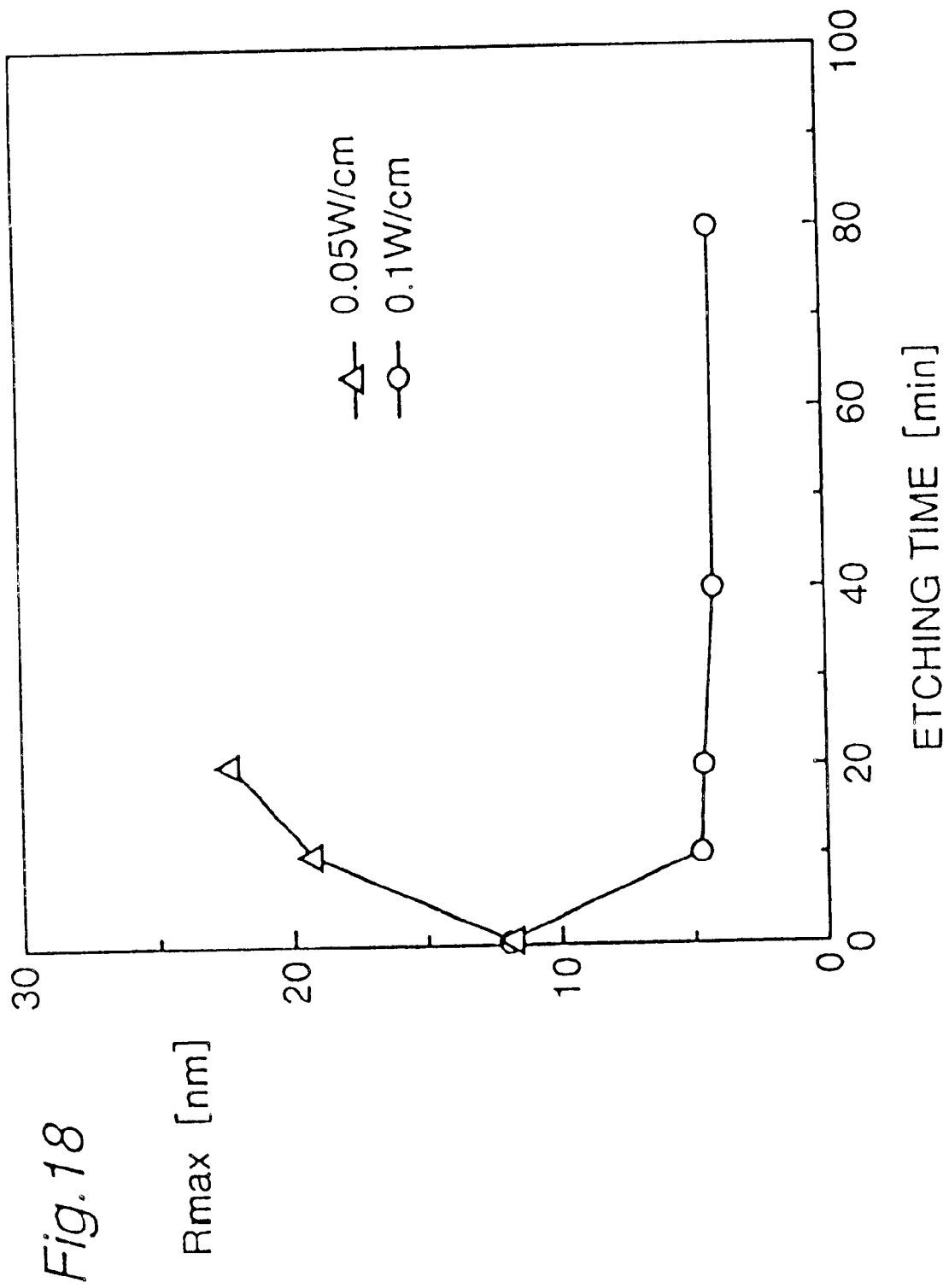
FIG. 18 is a graph comparing surface smoothness obtained with different etching powers, when the surface of the interference layer is etched.

FIG. 18 compares surface flatness with various etching powers, when the surface of the interference layer is etched. As shown in the figure, it was confirmed that when the etching power was set to 0.05 W/cm$^2$, desired flatness can be obtained by the etching for at least 10 min.

Figure 19:
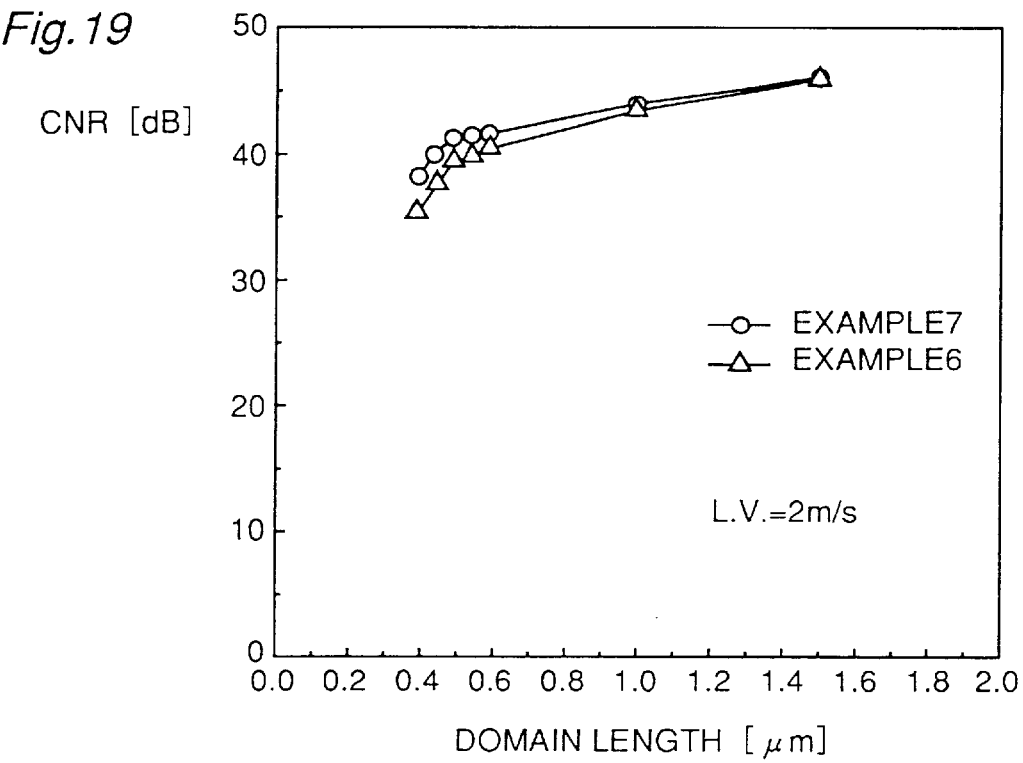
FIG. 19 is a graph showing CNRs of the read signals with respect to recording domain length of Examples 6 and 7.

FIG. 19 shows the CNRs of the reading signal with respect to the recording domain lengths of Examples 6 and 7. As shown in the figure, in Example 7, a good CNR could be obtained even when the recording domain length was far shorter. This may be caused by the fact that the surface of the interference layer was smoothed by etching so that the movement of magnetic walls was facilitated, and hence a domain more stable than in Example 6 was formed.

Figure 20:
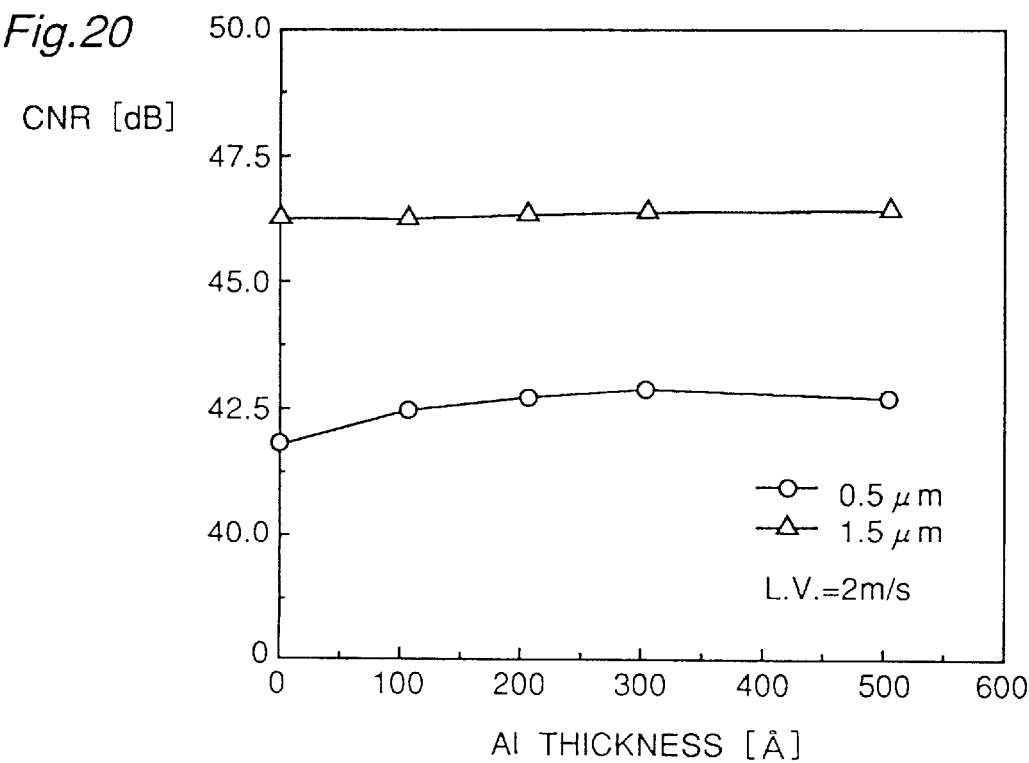
FIG. 20 is a graph showing the relation between the thickness of the heat diffusion layer and the CNRs of the read signals, when the Al heat diffusion layer is provided on the protective layer.

FIG. 20 shows the CNRs of the read signal with respect to the thickness of the heat diffusion layer, when the Al heat diffusion layer was formed on the protective film of the magneto-optical recording medium. The recording domain length was set to 0.5 μm or 1.5 μm. As shown in the figure, when the thickness of Al heat diffusion layer was set in the range of 200 Å to 500 Å, a good characteristic could be obtained. The heat diffusion layer of 200 Å corresponds to Example 7.

Figure 21:
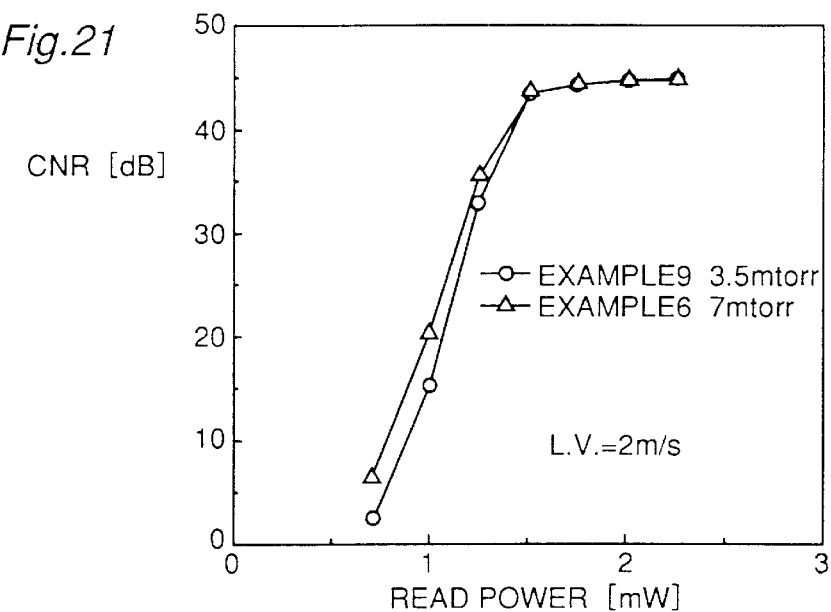
FIG. 21 is a graph showing CNRs of the read signals with respect to reading laser power of Examples 6 and 9.

FIG. 21 shows reading characteristics (the CNRs of the read signal with respect to reading laser power) of Examples 6 and 9. As shown in the figure, with the laser power of about 1.5 mW for reading being a boundary, the CNRs of the read signal changed abruptly in both examples, and it can be understood that a good characteristic is obtained. It was confirmed that such a good characteristic was ensured when the sputter gas pressure was set in the range of 2 mTorr to 7 mTorr in forming the reading layer.

As described above, by smothing the surface of the interference layer by etching with the etching power in the range of 0.02 mW/cm$^2$ to 0.08 W/cm$^2$, by changing the thickness of the interference layer within the range of 600 Å to 800 Å, by changing the thickness of the reading layer within the range of 800 Å to 1200 Å, by changing the Co content in the recording layer composition within the range of 10 at. % to 16 at. %, by changing Gd content in the reading layer composition within the range of 30 at. % to 36 at. %, by forming an Al heat diffusion layer on the protective layer to the thickness of 200 Å to 500 Å, or by changing the sputter gas pressure when the reading layer is formed within the range of 2 mTorr to 7 mTorr, the performance of the magneto-optical recording medium can be improved.

Example 10

Figure 22:
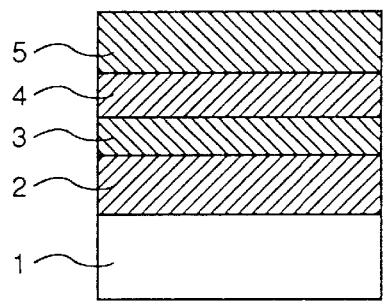
FIG. 22 is a cross section schematically showing the structure of the magneto-optical recording medium of Example 10.

FIG. 22 shows a cross sectional structure of the magneto-optical recording medium in accordance with Example 10. On a substrate 1 of polycarbonate (PC), an interference layer 2 of SiN having the thickness of 800 Å, a reading layer 3 of GdFeCo having the thickness of 500 Å, a recording layer 4 of TbFeCo having the thickness of 500 Å, and an oxidation preventing layer 5 of SiN having the thickness of 800 Å are formed in this order. Further, a UV cured resin layer having the thickness of about 20 μm was formed as a protective layer, though not shown. Each of the layers 1 to 5 shown in the figure could be formed, for example, by common sputtering or the like.

Figure 23:
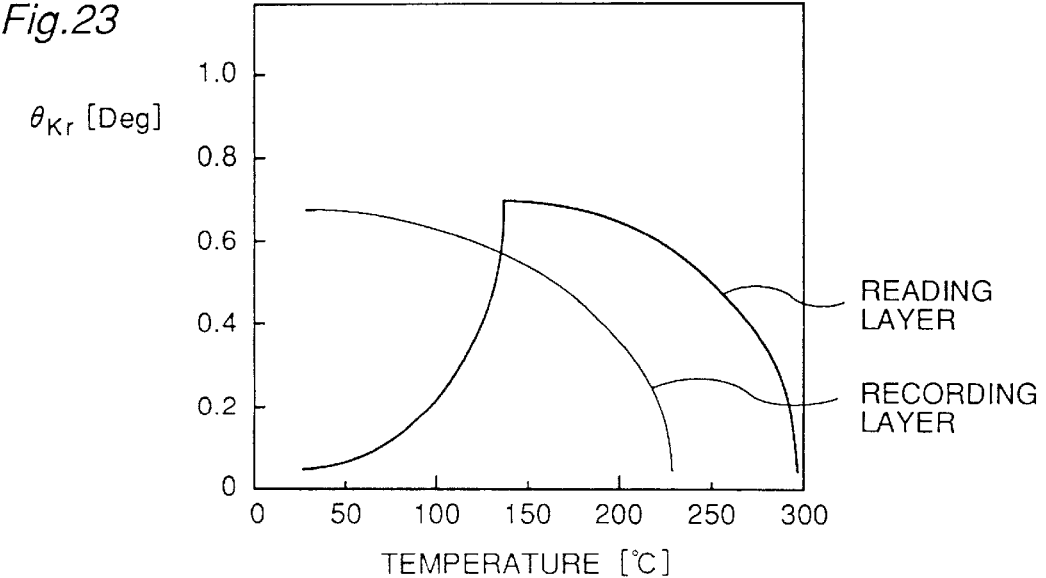
FIG. 23 is a graph showing the relation between remanence Kerr rotation angles and the temperatures of recording and reading layers of the medium in accordance with Example 10.

The composition of the reading layer is Gd:Fe:Co= 31:47:22 at. %, and the composition of the recording layer is Tb:Fe:Co=26:66:8 at. %. FIG. 23 shows the result of measurement of the change in the remanence Kerr rotation angle accompanying temperature elevation of the recording layer and the reading layer having the aforementioned compositions. As shown in the figure, the temperature at which the reading layer turns to a perpendicular magnetization film is 140° C., and Curie temperature is 300° C. Further, the Curie temperature of the recording layer is 230° C. and the temperature for compensation is room temperature. Reading is performed by transferring the direction of magnetization of the recording layer to the reading layer by heating to the transfer temperature of 140° C.

Figure 24:
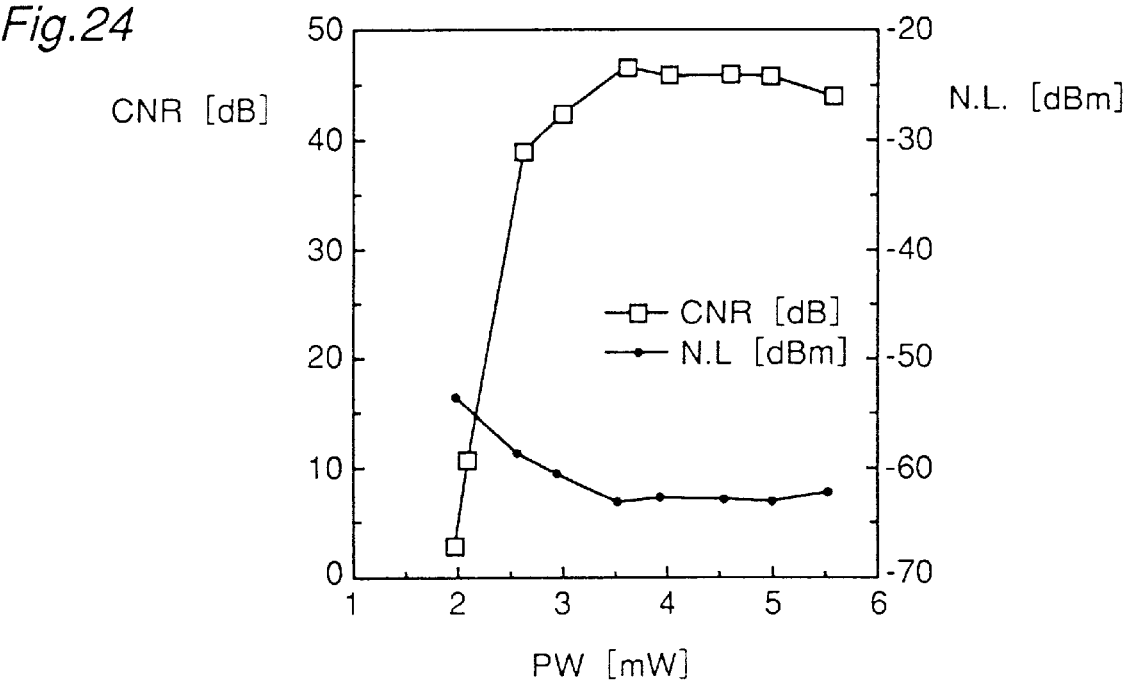
FIG. 24 is a graph showing the relation between noises and laser powers at the time of recording, of the medium in accordance with Example 10.
Figure 25:
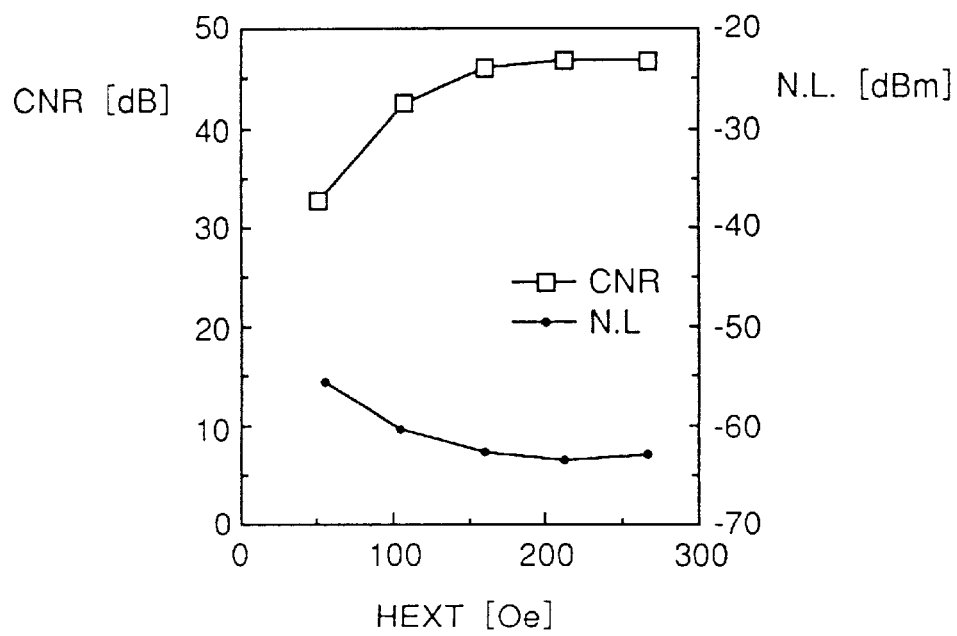
FIG. 25 is a graph showing the relation between noises and externally applied magnetic fields at the time of recording, of the medium in accordance with Example 11.

At the time of recording, the CNR is saturated when the laser power is at least 3.5 mW as shown in FIG. 24, and at this time, the reading layer is heated higher than Curie temperature. Therefore, recording is possible with the externally applied magnetic field as low as 50 Oe as shown in FIG. 25, and the CNR is saturated when it is 200 Oe or higher. In view of the fact that it was necessary to apply an external magnetic field of at least 500 Oe conventionally (*Optical Data Storage* 1994, Technical Digest Series Volume 10, pp. 128–129), it can be understood that the magneto-optical recording medium in accordance with the present invention allows recording with an extremely small magnetic field applied externally.

Example 11

The cross sectional structure of Example 11 is the same as that of Example 10. Example 11 differs from Example 10 in that the composition of the reading layer is Gd:Fe:Co= 31:44:25 at. %, and that the composition of the recording layer is Tb:Fe:Co=26:59:15 at. %.

Figure 26:
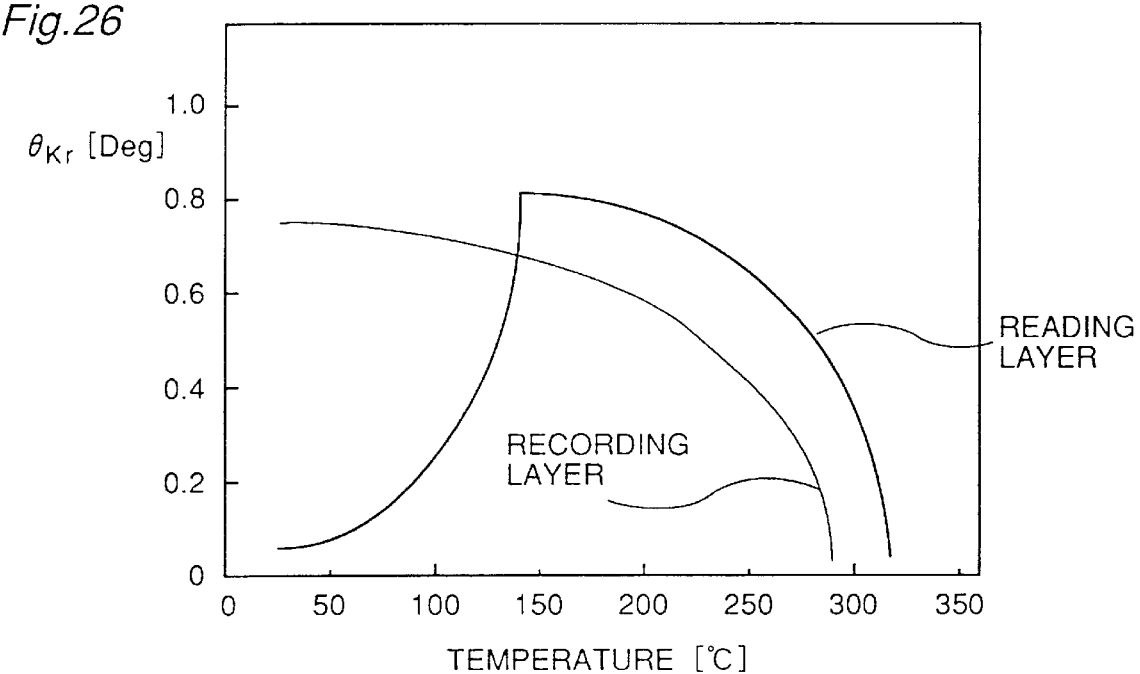
FIG. 26 is a graph showing the relation between temperatures and remanence Kerr rotation angles about the medium of Example 11.

FIG. 26 shows temperature characteristics of the remanence Kerr rotation angle of the recording and reading layers having the aforementioned compositions. As shown in the figure, the temperature at which the reading layer turns to the perpendicular magnetization film is 140° C., and Curie temperature is 320° C. Curie temperature of the recording layer is 290° C., and the compensation temperature is room temperature. More specifically, the difference in Curie temperatures of the recording and reading layers is as small as 30° C. Therefore, when the temperature becomes lower than the Curie temperature during cooling at the time of recording, not any part of magnetization of the reading layer is directed to the in-plane direction. Therefore, the direction of magnetization transferred from the reading layer to the recording layer is perpendicular, resulting in a good CNR.

Figure 27:
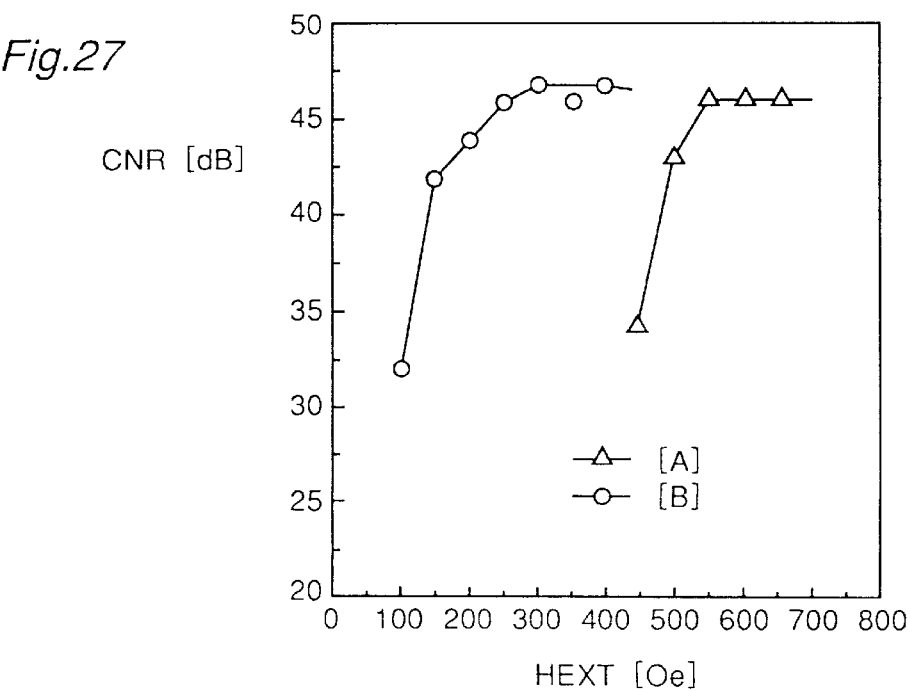
FIG. 27 is a graph showing the relation between CNRs and externally applied magnetic fields at the time of recording, of the medium in accordance with Embodiment 11 and the medium of Comparative Example 2.

In Example 11, as shown by [B] in FIG. 27, recording is possible with the externally applied magnetic field of as slow as 100 Oe, and the CNR is saturated where the magnetic field is 250 Oe or higher. In the figure, [A] represents Comparative Example 2 in which the reading layer has the composition of Gd:Fe:Co=31:34:35 at. % and Curie temperature of 360° C., and the recording layer has the composition of Tb:Fe:Co=26:66:8 at. % and Curie temperature of 230° C. In Comparative Example 2, it is necessary to apply the magnetic field of at least 500 Oe externally. It can be understood that the magneto-optical recording medium in which the reading layer has a Co content of 12 to 30 at. % allow recording with an extremely small externally applied magnetic field.

Example 12

Figure 28:
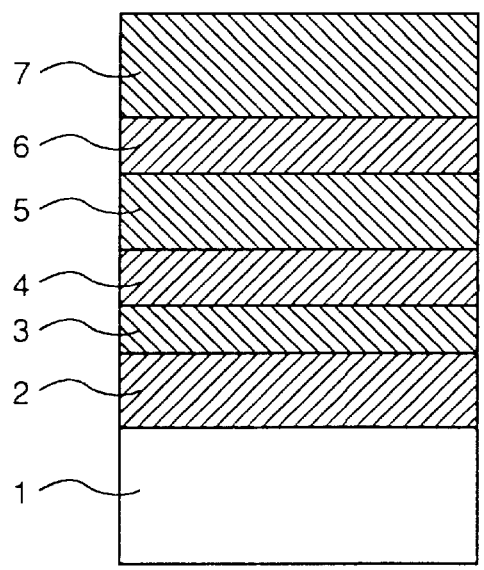
FIG. 28 is a cross section schematically showing the structure of the magneto-optical recording medium in accordance with Example 12.

FIG. 28 shows a cross sectional structure of the magneto-optical recording medium in accordance with Example 12.

In the magneto-optical recording medium, on a substrate of a polycarbonate (PC), a layer 2 having high index of refraction and formed of SiN having the thickness of 800 Å, a reading layer 3 of GdFeCo having the thickness of 500 Å, a recording layer 4 of TbFeCo having the thickness of 500 Å, an oxidation preventing layer 5 of SiN having the thickness of 800 Å and a heat diffusion layer 6 of Al having the thickness of 200 to 800 Å are formed, and further, a protective layer 7 of UV cured resin having the thickness of about 20 μm is formed. Each of the layers except the protective layer 7 could be formed, for example, by common sputtering.

Magneto-optical recording media of which the heat diffusion layer of Al has the thickness of 200 Å, 300 Å, 400 Å and 800 Å respectively were manufactured. These media do not sufficiently transmit light and should be used as a type of detecting the light reflected from the magnetic layer, because the total film thickness of the exchange coupling magnetic layer (meaning the recording and reading layers, wherein magnetization is transferred from the recording layer to the reading layer by exchanging coupling force) amounts to 1000 Å.

In each of the above media, when the reading layer is heated to a prescribed transfer temperature (140° C. in Example 10) by introducing laser spot from the side of the substrate, the direction of magnetization of the recording layer is transferred to the reading layer at a portion which is at a temperature higher than the threshold temperature. By utilizing this phenomenon, information in the recording layer is read out. The temperature where the spontaneous magnetization disappears in the recording layer is 250° C. Therefore, the information of the recording layer is maintained at the transfer temperature. In this example, the transfer temperature 140° C. of the reading layer and the temperature 400° C. here the spontaneous magnetization disappears are realized by setting the composition of Gd:FeCo=32:68 at. %, and the temperature 250° C. where the spontaneous magnetization of the recording layer disappears is realized by setting Td:FeCo=25:75 at. %.

The recorded information of each of the magneto-optical recording media of Example 12 (that is, magneto-optical recording media having the heat diffusion layers of 200 Å, 300 Å, 400Å, and 800 Å in thickness, respectively) were read and the CNRs were measured. As compared with the recording media without the heat radiating, the CNR was better in any of the recording media having the heat diffusion layer. As for the thickness of the Al heat diffusion layer, the characteristic is better with the thickness of 300 Å than 200 Å. However, the characteristic was approximately the same when the thickness was 300 Å, 400Å and 800 Å. Accordingly, the Al heat diffusion layer may have the film thickness of 200 Å, and the thickness of 300 Å or higher is more preferable.

Figure 29:
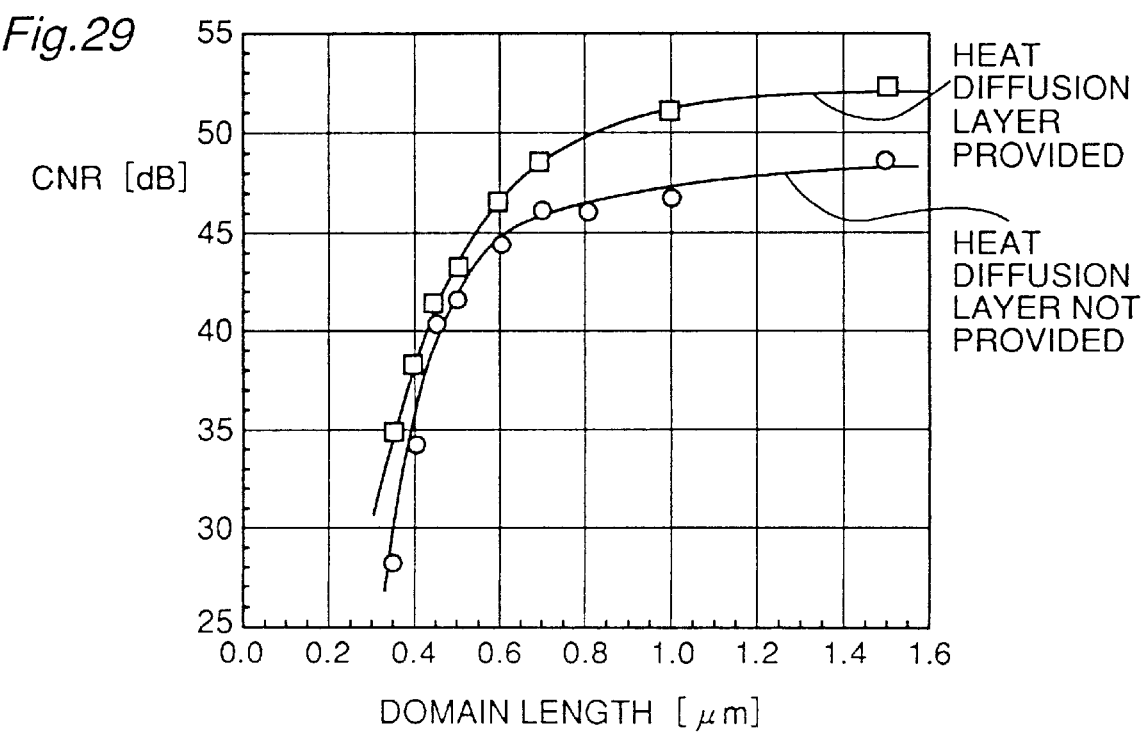
FIG. 29 is a graph showing CNRs of the read signals of the medium in accordance with Example 12.

FIG. 29 is a graph showing the result of measurement of the CNRs of the read signal of the medium in accordance with Example 12 (having the heat diffusion layer of 400 Å in thickness) and a medium not having the heat diffusion layer, relative to the recording domain length. As can be seen from the figure, the characteristic is much improved where the recording domain length is 0.8 μm or longer and where it is 0.4 μm or shorter. This is because the heat in the reading layer flows to the heat diffusion layer, resulting in good temperature distribution, whereby noises caused by random directions of magnetization and noises caused by undesirable reading of the portion other than the center of the laser spot (the peripheral portion which should be at a lower temperature) are suppressed.

Recording media were prepared in accordance with the structure of Example 12 with the composition ratio of the reading layer varied from Gd=30 at. % (in that case, the transfer temperature was about 70° C.) to Gd=33 at. % (in that case, the transfer temperature was about 160° C.), and the CNRs were measured in the similar manner as described above, and similar results were obtained.

Further, similar effects could be obtained when Ag, Cu, Au, W, or Mg having a superior heat conductivity was used as the heat diffusion layer instead of Al.

Example 13

Figure 30:
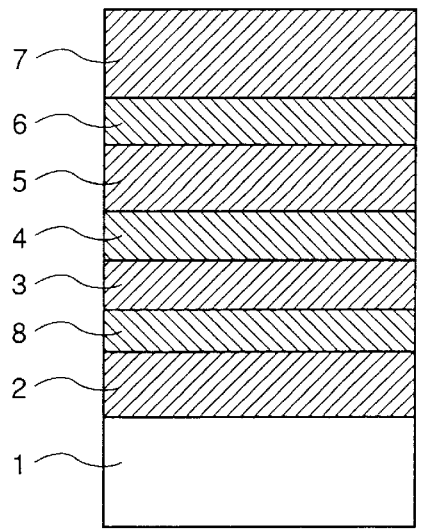
FIG. 30 is a cross section schematically showing the structure of the magneto-optical recording medium of Example 13.

FIG. 30 shows a cross sectional structure of the magneto-optical recording medium in accordance with Example 13. The magneto-optical recording medium differs from Example 12 in that an in-plane magnetization film 8 of NiO having the thickness of 500 Å is provided between the layer 2 having high refractive index formed of SiN and the reading layer 3 of GdFeCo. Except this point, it is the same as Example 12. Heat diffusion layer 6 was an Al film having the thickness of 400 Å.

The in-plane magnetization film 8 is a layer of which direction of magnetization exists in-plane in the temperature range from room temperature to Néel temperature (in this example, 100° C.). Further, since it is formed of NiO with the thickness of 500 Å, its transparency is sufficient for the laser beam entering from the substrate side and reflected by the reading layer to return to the substrate. The in-plane magnetization film is provided in order to align the direction of magnetization of the reading layer at the initial state so as to improve the CNR. More specifically, the direction of magnetization of the reading layer at the initial state is not completely in-plane, because of the influence of magnetic coupling, as the recording layer is a perpendicular magnetization film. However, the initial state of the reading layer has influence on the process where magnetization of the reading layer changes from in-plane to perpendicular at the time of signal reading. Therefore, by additionally providing the in-plane magnetization film, the noises caused by random directions of magnetization and crosstalk noises caused by undesirable reading of signals from low temperature portions could be reduced. The above described effects can further be enhanced by appropriately selecting Curie temperature or Néel temperature. As the in-plane magnetization film, CoNiO, CoO, MnFe, FeCr, FeNi, PtCo and PdCo or the like may be used other than the aforementioned NiO.

The CNR of the read signal of the magneto-optical recording medium of Example 13 was measured in the similar manner as in Example 12, and a good CNR could be obtained. A recording medium without the heat diffusion layer was made for comparison, and a better CNR could be obtained by the recording media of Example 13, than the recording media not having the heat diffusion layer.

Example 14

Figure 31:
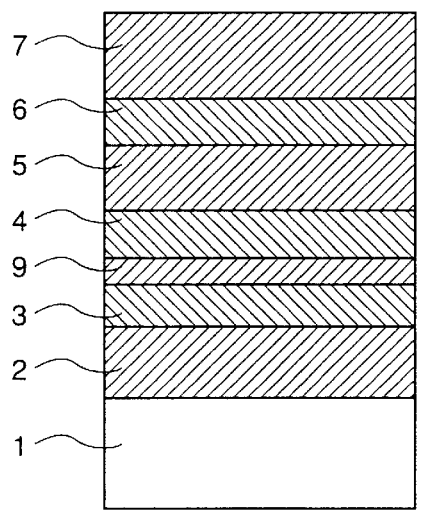
FIG. 31 is a cross section schematically showing the structure of the magneto-optical recording medium in accordance with Example 14.

FIG. 31 shows a cross sectional structure of the magneto-optical recording medium of Example 14. The medium of Example 14 is similar to the structure of Example 13 except that the in-plane magnetization film of NiO is not provided, and an intercepting magnetic layer 9 of TbFeCoAl having the thickness of 300 Å is provided between the reading layer 3 of GdFeCo and the recording layer 4 of TbFeCo. Except these points, it is the same as Example 13, and an Al film having the thickness of 400 Å was used as the heat diffusion layer.

The temperature at which the spontaneous magnetization disappears in the intercepting layer 9 is 190° C., which is set lower than the temperature at which the spontaneous magnetization disappears in the recording layer. In this example, the temperature 190° C. is realized by setting the Al content to 17 at. %. The intercepting magnetic layer is provided in order to prevent recording of information to the recording layer from being influenced by the thermo-magnetic characteristic of the reading layer. More specifically, when the portion heated by laser spot irradiation with the recording power is cooled and becomes lower than 250° C. (the temperature at which the spontaneous magnetization of the recording layer disappears) in recording information, the direction of magnetization of the recording layer will be directed to the direction of the externally applied magnetic field independent from the reading layer, as there is no magnetization of the intercepting magnetic layer at 250° C. If the temperature is further lowered to 190° C. (at which the spontaneous magnetization of the intercepting magnetic layer begins to disappear) or lower, the direction of magnetization of the intercepting magnetic layer follows the direction of magnetization of the recording layer. Therefore, at the transfer temperature of a little over 140° C. at the time of reading, which is lower than 190° C., the intercepting magnetic layer behaves in the similar manner as the recording layer. As the intercepting magnetic layer, TbFeCoNb, TbFeCoCr, TbFeCoNi or the like may be used other than TbFeCoAe.

The CNR of the read signal of the medium in accordance with Example 14 was measured in the similar manner as Example 12, and a good CNR could be obtained. Further, a recording medium not having the heat diffusion layer was prepared for comparison, and it was found that a better CNR could be obtained by the recording medium of Example 14.

Example 15

Figure 32:
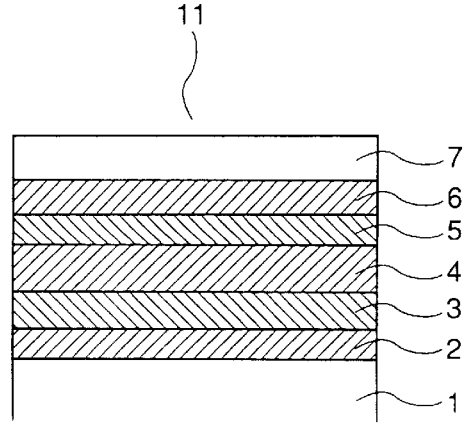
FIG. 32 is a cross section schematically showing the structure of the magneto-optical recording medium in accordance with Example 15 of the present invention.

In this example, the substrate, conditions for recording and so on for the magneto optical recording medium will be described with reference to drawings and tables. The miagneto-optical disc of this example has a recording layer which is a perpendicular magnetization film, and a reading layer which is an in-plane magnetization film at room temperature. A specific example of the super resolution magneto-optical recording medium in which the magnetization of the recording layer is transferred to the reading layer at the time of laser beam irradiation, enabling reading of the recorded information, will be described. This medium allows highly density recording and reading. FIG. 32 shows a cross sectional structure of the magneto-optical recording medium 11 of this example. An interference layer 2 is formed on a transparent polycarbonate substrate 1, and on the interference layer 2, a reading layer 3, a recording layer 4, a protective layer 5, a heat diffusion layer 6 and ultraviolet cured resin 7 are deposited in this order.

Figure 33:
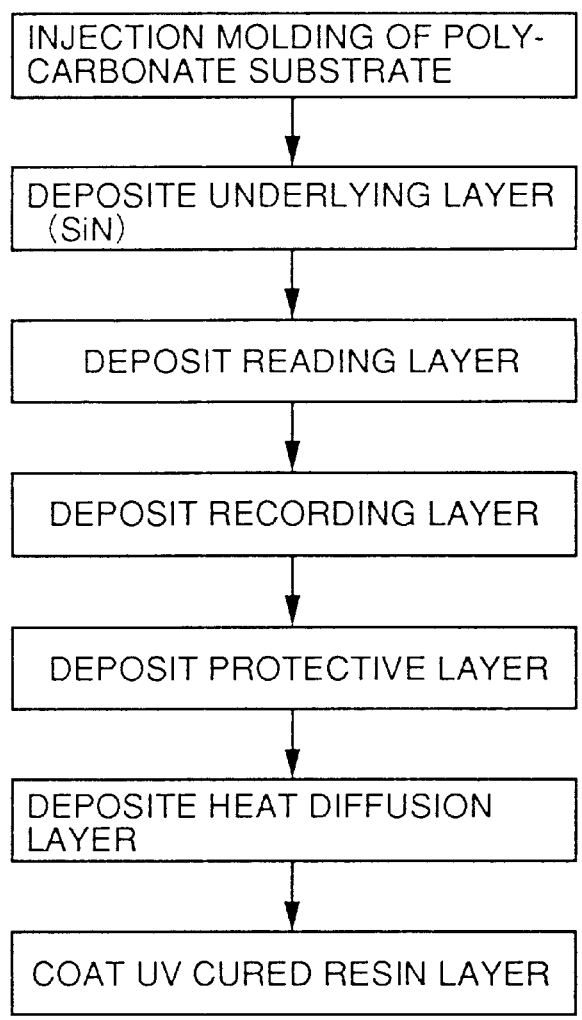
FIG. 33 is a chart showing the process for manufacturing the medium of Example 15.

First, the steps for manufacturing the magneto-optical disc in accordance with the present invention are as shown in FIG. 33. A transparent polycarbonate substrate is formed by injection molding, SiN is deposited on the substrate, and SiN is etched by plasma etching. Thereafter, the respective layers are deposited successively.

Figure 34:
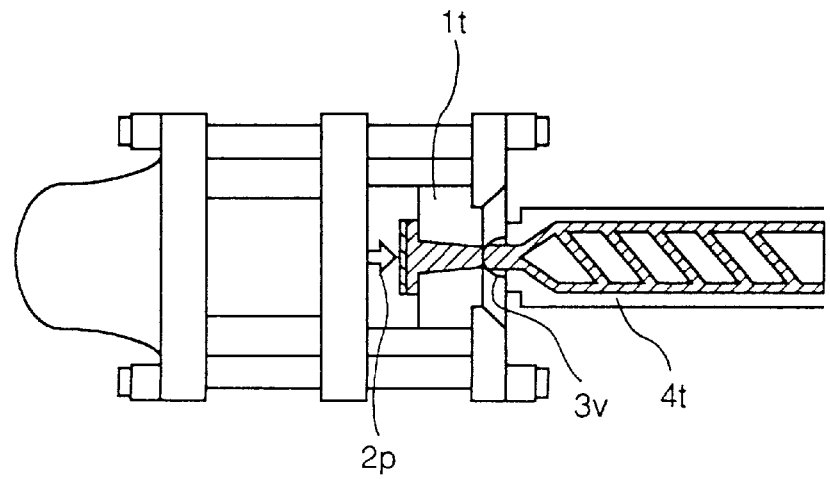
FIG. 34 is a schematic diagram showing an injection molding apparatus for preparing a transparent polycarbonate substrate used in the present invention.

In this example, a polycarbonate substrate is used instead of a glass substrate which has been conventionally used for the super resolution magneto-optical recording medium. Injection molding of transparent polycarbonate substrate will be described. Referring to FIG. 34, injection molding of the transparent polycarbonate substrate is much influenced by the temperature $1t$ of the mold, closing pressure $2p$, resin injection velocity $3v$, temperature $4t$ of the heating cylinder and the time period of cooling. In this example, molding was performed in accordance with the conditions Nos. 1, 2, 3 and 4 shown in Table 1, with the track pitch of 1.4, 1.2, 1.0, and 0.08 μm and the widths of a groove and a land being set to 1:1. More specifically, injection molding was performed under the following conditions. Mold temperature: 118 to 125° C., closing pressure: 180 to 220 kg/cm$^2$, resin injection velocity 150 to 200 (mm/s), temperature of heating cylinder: 310 to 340° C., cooling time: 9 to 13 sec. When the transfer rate of the molded substrate was represented by the ratio of the depth of the groove of the transparent polycarbonate substrate to the depth of the groove of the stamper, a transfer rate as high as at least 90% could be obtained under any of the aforementioned conditions. Surface conditions of the substrates molded under the aforementioned conditions were measured by an atomic force microscopy, and the radii of curvature at the corners of the groove and the land and so on were calculated based on the AFM data, which results are as shown in Table 2. As a result, for the respective track pitches, the radii of curvature were 35 to 50 nm, the maximum value of birefringence in absolute value Δnd was 20 to 25 nm, and fluctuation in birefringence was 8 to 10 nm, which values were all satisfactory. The surface roughness of the molded polycarbonate substrate was 10 to 50 nm, which was satisfactory. Especially for the track pitch of 1.4 μm used in this example, the radius of curvature was 35 nm, the maximum value of the birefringence in absolute value was 22 nm and the fluctuation in the circumferential direction was 8 nm which values were all satisfactory. Birefringence was measured by using He-Ne laser having the wavelength of 633 nm, with double paths.

TABLE 1

| No. | Mold Temperature (° C.) | Closing Pressure (kg/cm$^2$) | Resin Injection Velocity (mm/s) | Temperature of Heating Cylinder (° C.) | Cooling Time (sec) |
| --- | --- | --- | --- | --- | --- |
| 1 | 120 | 200 | 180 | 320 | 13 |
| 2 | 125 | 180 | 180 | 340 | 12 |
| 3 | 120 | 220 | 150 | 340 | 9 |
| 4 | 118 | 200 | 200 | 310 | 10 |

TABLE 2

| No. | Track Pitch (μm) | Groove Depth (nm) | Radius of Curvature (nm) | Birefringence (nm) | Fluctuation of Birefringence (nm) |
| --- | --- | --- | --- | --- | --- |
| 1 | 1.4 | 68 | 35 | 22 | 8 |
| 2 | 1.2 | 68 | 35 | 20 | 6 |
| 3 | 1.0 | 67 | 40 | 24 | 10 |
| 4 | 0.8 | 65 | 50 | 25 | 8 |

Thereafter, on the injection molded polycarbonate substrate, an SiN film as an interference layer is deposited to 700 Å under the condition shown in Table 3, by RF sputtering. After the deposition of SiN, the surface of SiN film was smoothed by plasma etching. Thereafter, $Gd_xFe_{100-(x+y)}Co_y$ was deposited to 1000 Å as the reading layer, $Tb_xFe_{100-(x+y)}Co_y$ was deposited to 500 Å as the recording layer, an SiN film was deposited to 800 Å as the protective film, Al was deposited to 500 Å as the heat diffusion layer 6, and UV cured resin 7 was deposited to 10 μm. For the SiN as the interference layer, among the conditions shown in Table 3, RF power: 500 W, Ar pressure: 5 mTorr is more preferable. $Gd_xFe_{100-(x+y)}Co_y$ as the reading layer was deposited under the conditions shown in Table 4 by RF two element magnetron sputtering. Among the condition shown in Table 4, RF power: Gd; 70 W, FeCo; 200 W and Ar pressure: 7 mTorr is more desirable. As for the composition of $Gd_xFe_{100-(x+y)}Co_y$, x may be in the range of 25 to 35 and y may be in the range of 0 to 40. For example, x of 30 and y of 40 were used. $Tb_xFe_{100-(x+y)}Co_y$ as the recording layer was deposited under the condition shown in Table 5 by RF magnetron sputtering. Among the conditions shown in Table 5, the condition of RF power: 500 W and Ar pressure: 5 mTorr is more preferable. As for the composition of $Tb_xFe_{100-(x+y)}Co_y$, x may be in the range of 15 to 35 and y may be 5 to 30, and x of 22.5 and y of 14.5 were used, for example. The SiN as the protective layer was deposited under the conditions shown in Table 3 by RF magnetron sputtering. Among the conditions shown in Table 3, the condition of RF power: 500 W and Ar pressure: 5 mTorr is more preferable. Al as the heat diffusion layer was deposited by RF magnetron sputtering, by using Al alloy such as Al—Ti, Al—Mn or Al—Nb as a target, under the conditions shown in Table 6. Among the conditions shown in Table 6, the condition of RF power: 800 W and Ar pressure: 5 mTorr is more preferable. At this time, the film formation rate of Al is about 100 Å/min. The heat diffusion layer is not limited to Al, and Au, Pt, Ti, V, Cr, Mn, Fe, Co, Ni, Cu, Zn, Mo, Ag, Sn, Sb, or W may be used. Alternatively, an alloy of an arbitrary combination of these elements may be used. UV cured resin 7 was formed by a common method on the protective layer.

TABLE 3

SiN Film Forming Conditions

| Film Forming Method | RF Magnetron Sputtering |
|---|---|
| RF Power | 50–800 W |
| Ar Pressure | 1–10 mTorr |
| Film Thickness | 60–90 nm |

TABLE 4

Reading Layer Forming Conditions

| Film Forming Method | RF two Element Magnetron Sputtering |
|---|---|
| Target | Gd/FeCo Alloy Targets |
| RF Power | 50–900 W |
|  | (Gd:70 W, FeCo: 200 W) |
| Ar Pressure | 2–10 mTorr |

TABLE 5

Reading Layer Forming Conditions

| Film Forming Method | RF Magnetron Sputtering |
|---|---|
| Target | Gd/FeCo Alloy Targets |
| RF Power | 50–900 W |
| Ar Pressure | 2–10 mTorr |

TABLE 6

Al Film Forming Conditions

| Film Forming Method | RF Magnetron Sputtering |
|---|---|
| RF Power | 100–1000 W |
| Ar Pressure | 1–10 mTorr |
| Film Thickness | 0–100 nm |

Figure 35:
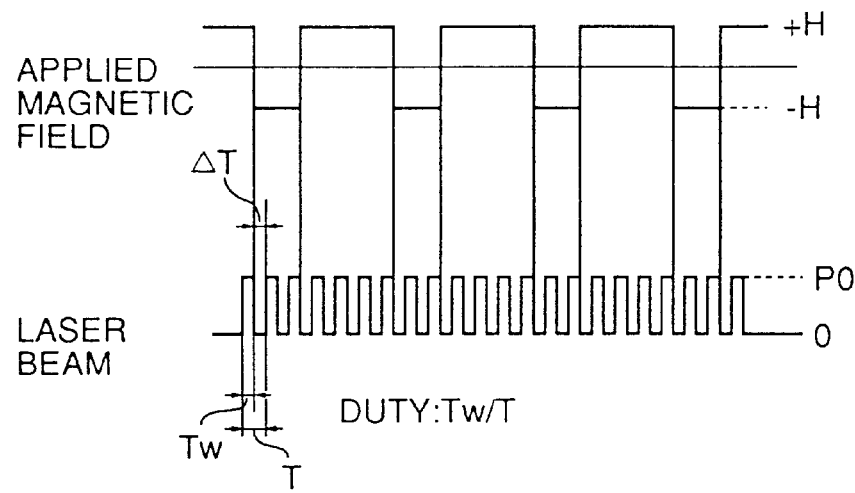
FIG. 35 shows the relation between a pulsed laser and an applied magnetic field, in recording on the magneto-optical recording medium of the present invention.
Figure 36:
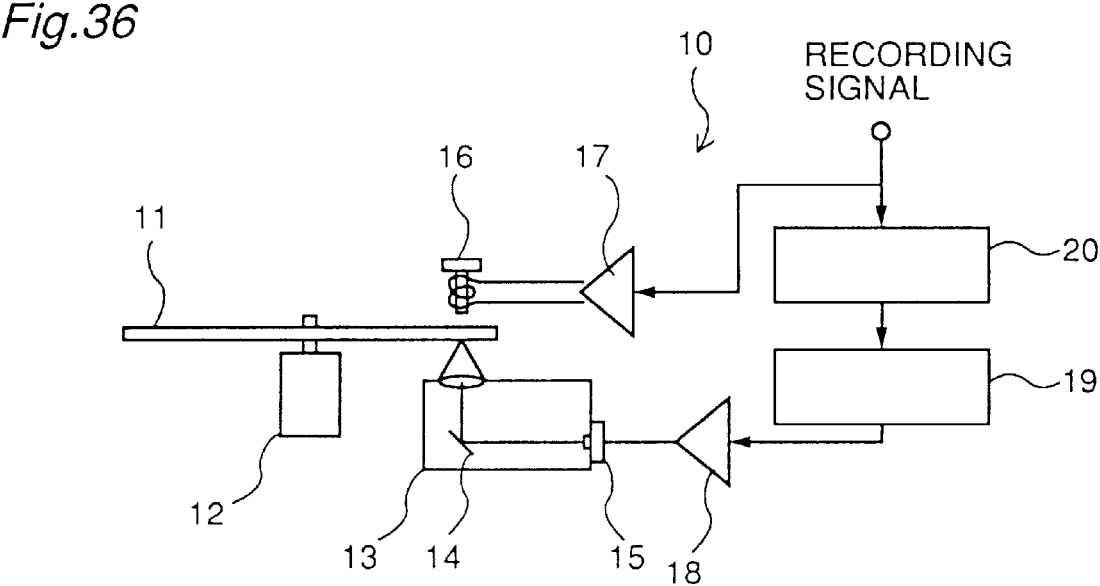
FIG. 36 is a schematic diagram showing a system for recording in a magneto-optical recording medium in accordance with the present invention.

Recording/reading of the magneto-optical recording medium manufactured as above will be described. Instead of the conventional recording technique in which laser beam of a constant intensity was emitted, a pulse modulation technique in which laser beam is pulsed was employed as shown in FIG. 35. FIG. 36 is a block diagram of the recording apparatus. The recording signal enters a synchronous pulse generation/phase delay circuit 20, and it is first converted to a signal having the duty of 50% in synchronization with the recording signal, and then it is converted to a pulse signal with the phase delayed by 0 to 60 ns. The pulse signal enters a pulse width changing circuit 19 and changed to a pulse signal having the duty of 20 to 60%, and introduced to a semiconductor laser driving circuit 18. The semiconductor laser driving circuit 18 turns ON/OFF a semiconductor laser 15 in accordance with the pulse signal which has changed to have a prescribed duty, and pulsed laser beam is directed to the magneto-optical recording medium 11 through a mirror 14 and an objective lens 21. The recording signal is directly transmitted to a magnetic head driving circuit 17, the magnetic head driving circuit 17 drives the magnetic head in accordance with the input recording signal, and each recording signal is recorded on the magneto-optical recording medium.

Figure 37:
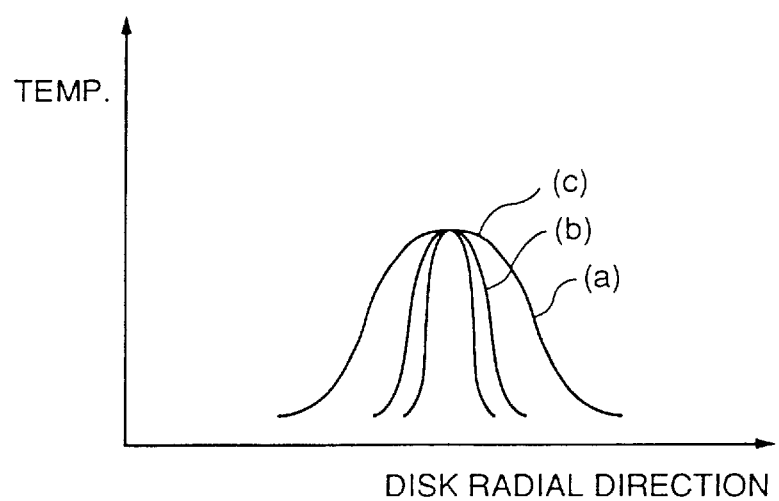
FIG. 37 shows, qualitatively, the effects of laser beam pulsing and the heat diffusion layer in the medium of the present invention.

In this example, since the laser beam is pulsed, the relation between the pulsed laser beam and the applied magnetic field corresponding to the recording signal is such that the signal is recorded while the laser is turned ON twice, as shown in FIG. 35. Therefore, as shown qualitatively in FIG. 37, as compared with the conventional method (a) in which recording is performed with a laser beam of constant intensity being continuously emitted, the uniformly heated area in the recording layer is made smaller (b). This effect can also be obtained by depositing Al as the heat diffusion layer on the recording layer, other than by pulsing the laser beam. Further, the effect becomes more remarkable when the formation of the heat diffusion layer and the laser beam pulsing are both performed, resulting in a narrower uniformly heated area (c).

In this example, recording to the magneto-optical recording medium was performed under the condition shown in Table 7. The conditions that laser wavelength: 680 nm, numerical aperture of objective lens: 0.55, recording linear velocity: 2.0 m/s and recording frequency: 2.0 MHz were constant. As for the recording magnetic field, recording power and duty of the optical pulse, ±200 Oe, 6 mW and 40% among the conditions shown in Table 7 are preferable.

Figure 38:
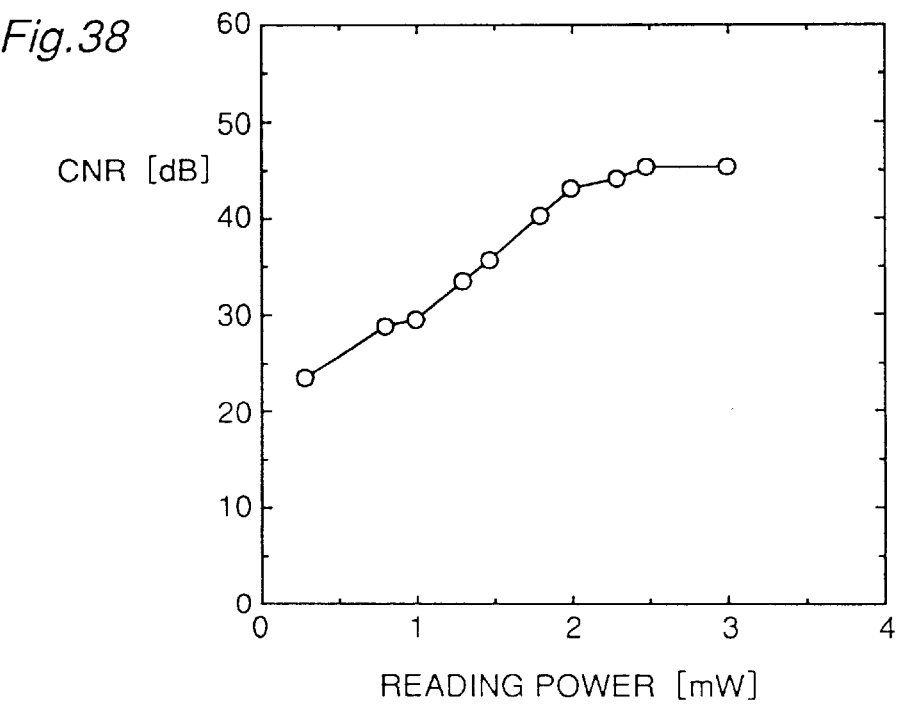
FIG. 38 is a graph showing the relation between reading powers and CN ratios at the time of reading of the magneto-optical recording medium in accordance with the present invention.

Reading of the magneto-optical recording medium was performed under the conditions shown in Table 8 in which high density recording was achieved with the domain length of 0.5 μm by laser beam pulsation and formation of heat diffusion layer. The conditions that laser wavelength: 680 nm, numerical aperture of the objective lens: 0.55 and reading linear velocity: 2.0 (±0.1) m/sec were constant. Among the conditions shown in Table 8, recording power of at least 2.0 mW is preferred. The reading power of at least 2.0 mW is determined as the reading power which ensures a high CNR in consideration of the relation between the CNR at the time of reading and the reading power shown in FIG. 38. More specifically, referring to FIG. 38, as the reading power increases, the CNR at the time of reading improves, and with the reading power of 2.0 mW or higher, an approximately constant CNR of 42 to 44 dB is obtained. Therefore, the laser power of at least 2.0 mW is determined as the reading power which provides a high CNR. Thus, satisfactory reading powers for different reading linear velocities were determined in a similar manner, and it was found that reading power of 1.5 to 2.2 mW for the reading linear velocity of 1.1 to 1.3 m/sec, reading power of 1.8 to 2.7 mW for the reading linear velocity of 1.5 to 1.7 m/sec, reading power of 2.4 to 3.7 mW for the reading linear velocity of 2.9 to 3.1 m/sec, reading power of 3.2 to 4.5 mW for the reading linear velocity of 4.9 to 5.1 m/sec, and reading power of 4.0 to 6.0 mW for the reading linear velocity of 8.9 to 9.1 m/sec were preferable. The recording conditions are also suitable for the magneto-optical recording media of Examples 1 to 14.

TABLE 7

Recording Conditions

| Laser Wavelength | 680 nm |
|---|---|
| Numerical Aperture of Objective Lens | 0.55 |
| Recording Linear Velocity | 2.0 m/s |
| Recording Frequency | 2.0 MHz |
| Recording Magnetic Field | ±50–500 Oe |
| Recording Power | 3–9 mW |
| Duty of Optical Pulse | 20–60% |

TABLE 8

Reading Conditions

| Laser Wavelength | 680 nm |
|---|---|
| Numerical Aperture of Objective Lens | 0.55 |
| Reading Linear Velocity | 2.0 m/s |
| Reading Power | 0.3–3 mW |

Figure 39:
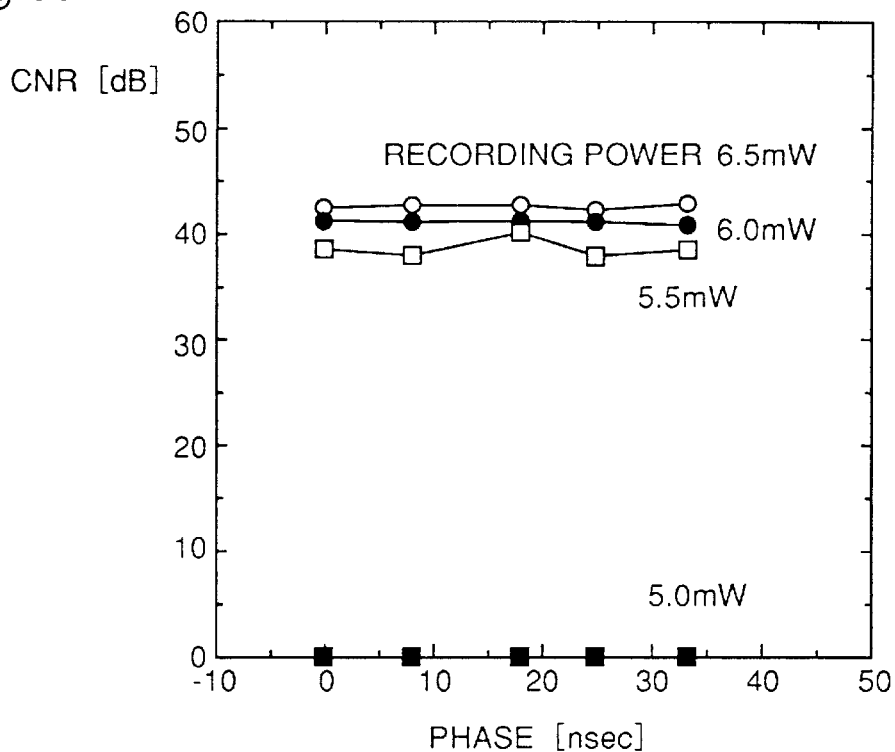
FIG. 39 shows the relation between CN ratios at the time of reading and phase differences between the pulsed laser beam and the pulsed magnetic field at the time of recording of the magneto-optical recording medium of the present invention.
Figure 40:
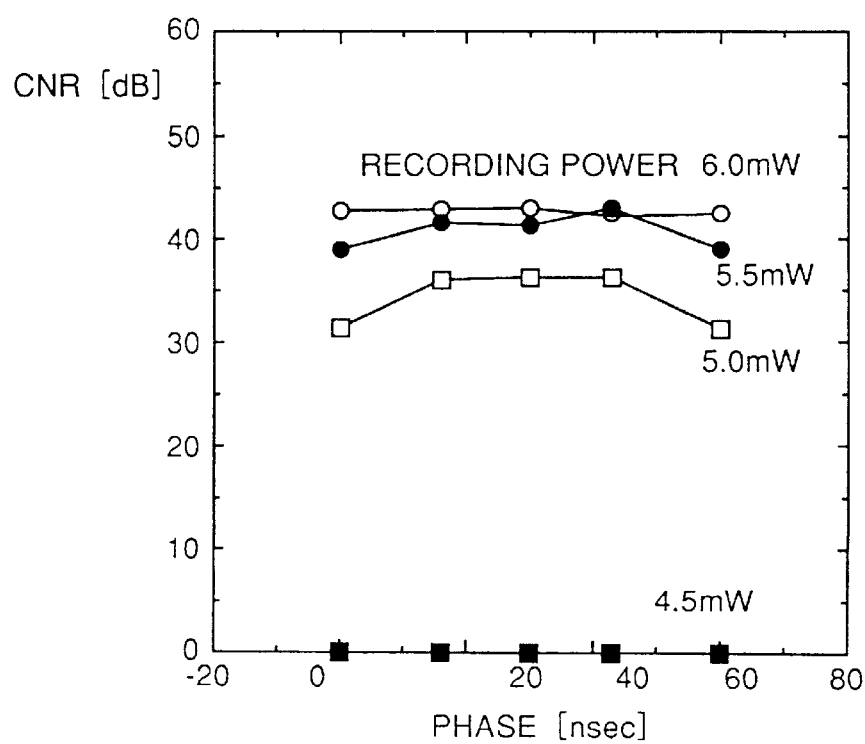
FIG. 40 shows the relation between CN ratios at the time of reading and phase differences between the pulsed laser beam and the pulsed magnetic field at the time of recording, of the magneto-optical recording medium in accordance with the present invention.

FIGS. 39 and 40 show reading characteristics of the above described magneto-optical recording medium for high density recording. FIG. 39 shows the relation between phase differences (phase differences between the pulsed magnetic field and the pulsed laser beam) at the time of recording and CNRs (carrier to noise ratios) at the time of reading. The recording conditions were the followings: laser wavelength: 680 nm, numerical aperture of objective lens: 0.55, pulse width of pulsed magnetic field: 500 nsec and pulse number of pulsed laser beam: 4 times. The laser power at the time of recording was changed to 5.0, 5.5, 6.0 and 6.5 mW as a parameter. With the phase difference at the time of recording being within the range of 0 to 33 nsec, when the laser power at the time of recording increases from 5.0 mW to 5.5 mW, the CNR immediately improves from 0 to 37–40 dB, and as the laser power at the time of recording increases from 5.5 to 6.5 mW, the CNR improves gradually. With the laser power of 6.5 mW at the time of recording, the CNR of about 43 dB could be obtained.

FIG. 40 shows the relation between phase differences (phase differences between the pulsed magnetic field and the pulsed laser beam) at the time of recording and CNRs at the time of reading. The recording conditions were the followings: the laser wavelength: 680 nm, numerical aperture of the objective lens: 0.55, pulse width of pulsed magnetic field: 500 nsec, number of pulses of pulsed laser beam: two times. The laser power at the time of recording was changed to 4.5, 5.0, 5.5 and 6.0 mW as a parameter. With the phase difference at the time of recording being in the range of 0 to 60 nsec, and the laser power at the time of recording was increased from 4.5 mW to 5.0 mW, the CNR immediately improved from 0 to about 35 dB, and as the laser power at the time of recording was increased from 5.0 to 6.0 mW, the CNR increased gradually. A maximum CNR of 45 dB was obtained with the laser power at the time of recording being 6.0 mw.

From the comparison of FIG. 39 with FIG. 40, it can be understood that by reducing the number of pulses of the laser beam at the time of recording from 4 to 2, as shown in FIG. 40, the laser power at the time of recording which provides a good CNR at the time of reading can be reduced from 5.5 mW to 5.0 mW.

Figure 41:
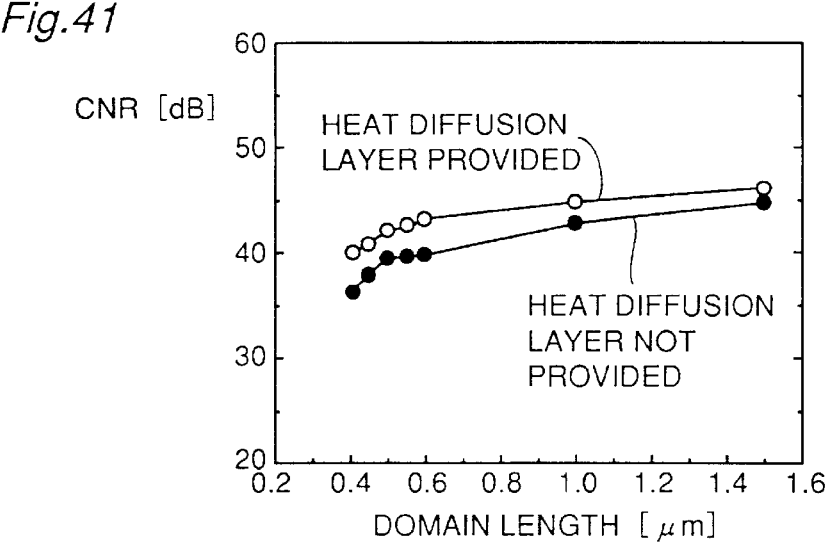
FIG. 41 is a graph showing effects of the heat diffusion layer of the magneto-optical recording medium in accordance with the present invention.

The effect of the aforementioned heat diffusion layer in reading is apparent from the relation between the CNR and the domain length shown in FIG. 41. More specifically, with the domain length being in the range of 0.4 to 1.5 μm, when the heat diffusion layer is provided, the CNR at the time of reading is improved by about 1 to about 3 dB. The shorter the domain length, the more improved the CNR. Therefore, similar results can be obtained when the domain length is 0.4 μm or shorter. Further, it was found that the provision of the heat diffusion layer on the recording layer was effective in reading the medium having short domain length, that is, having high density.

Further, the thickness of Al as the heat diffusion layer is not limited to 500 Å, and it may be in the range of 200 Å to 1000 Å. The range of the film thickness was determined based on the relation between the Al film thickness and the reading resolution shown in Table 9. More specifically, as the thickness of Al increases, the reading resolution improves, and the reading resolution becomes approximately constant when the thickness attains to 200 Å or higher.

TABLE 9

| AlFilm Thickness (nm) | 0 | 20 | 30 | 50 | 100 |
|---|---|---|---|---|---|
| Reading Resolution | 0.47 | 0.7 | 0.72 | 0.72 | 0.73 |

*Reading Resolution: 0.5 μm Domain Amplitude/2 μm Domain Reading Amplitude

Example 16

Figure 42:
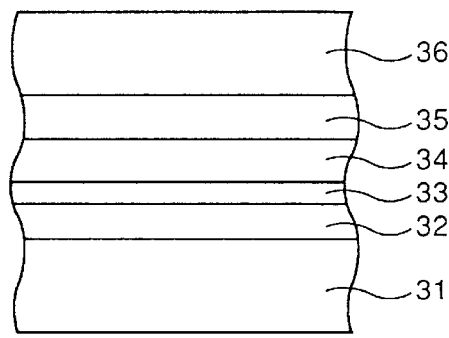
FIG. 42 is a cross section schematically showing the structure of the magneto-optical recording medium in accordance with Example 16.

In this example, the recording layer of the magneto-optical recording medium will be described with reference to FIGS. 42, 43, 44, and 45, and Table 10. FIG. 42 shows a cross sectional structure of the magneto-optical disc of this example. It is manufactured through the following steps. First, similar to a common magneto-optical disc, an SiN layer 32 is deposited by sputtering to the thickness of 800 Å as a protective layer and for optical enhancement, on a polycarbonate substrate 31. Thereafter, a reading layer 33 of $Gd_{30}Fe_{55}Co_{15}$ is deposited to 500 Å, and a recording layer 34 of $(Mn_{80}Cr_{20})_2Sb$ was deposited to the thickness of 1000 Å by sputtering using a composite target which has Cr and Sb chips placed on an Mn target. Thereafter, an SiN layer 35 is deposited to the thickness of 800 Å by sputtering as the protective layer, and thereafter an UV cured resin layer 36 was formed to the thickness of 10 μm by spin coating. Sputtering conditions of these layers are as shown in Table 10. Among the conditions shown in Table 10, for forming SiN layer 32, the condition that argon gas pressure: 0.4 Pa and applied power: 300 W is optimal, for forming the reading layer 33 of $Gd_{30}Fe_{55}Co_{15}$, the condition of argon gas pressure: 0.67 Pa and applied power: 400 W is optimal, for forming the recording layer 34 of $(Mn_{80}Cr_{20})_2Sb$, the condition of argon gas pressure: 0.67 Pa and applied power: 350 W is optimal, and for forming SiN layer 35, the condition of argon gas pressure: 0.4 Pa and applied power: 300 W is optimal. The UV cured resin layer 36 was spin coated under the condition of dropping amount: 5 cc, spin condition (intermediate speed: 100 rpm, 2 sec, high speed: 900 rpm, 3 sec), exposure time: halogen 1 kW, 5 sec. $(Mn_{80}Cr_{20})_2Sb$ of recording layer 34 is a magnetic which exhibits transition from an antiferromagnetic to a ferromagnetic, and $Gd_{30}Fe_{55}Co_{15}$ of reading layer 33 exhibits in-plane magnetization at room temperature.

TABLE 10

| Materials | Targets | Argon Gas Pressure (Pa) | Applied Power (W) |
| --- | --- | --- | --- |
| $Gd_{30}Fe_{55}Co_{15}$ | Fe + Gd,Co chips | 0.27–2.7 | 100–500 |
| $(Mn_{100-x}Cr_x)_2Sb$ | Mn + Cr,Sb chips | 0.27–2.7 | 50–500 |
| $Si_3N_4$ | $Si_3N_4$ | 0.14–1.4 | 300 |

Figure 43:
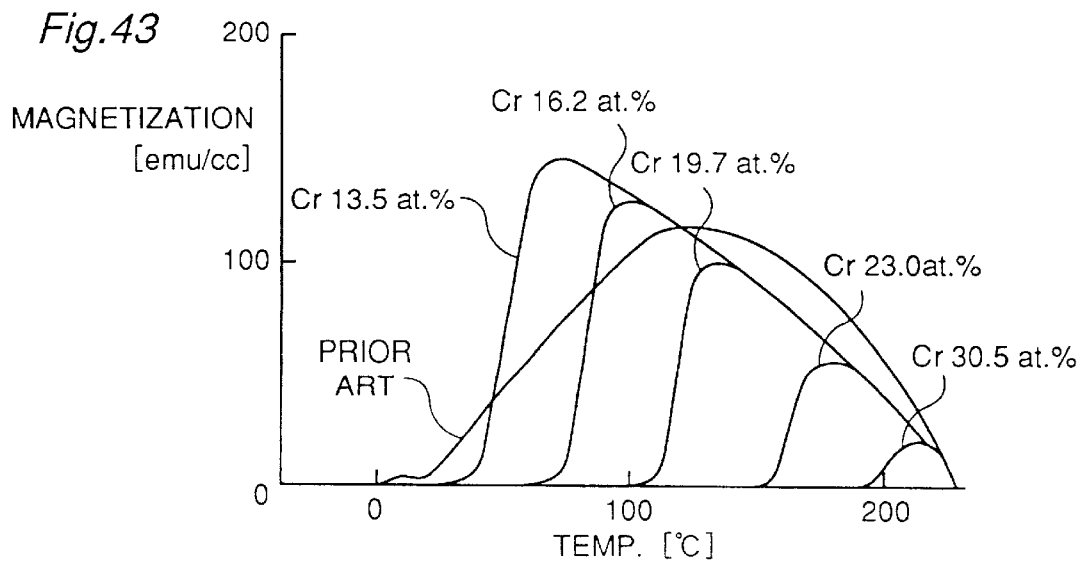
FIG. 43 is a graph showing a magnetization characteristic of the recording layer formed in Example 16.

FIG. 43 shows temperature dependencies of magnetization of $(Mn_{100-x}Cr_x)_2Sb$ with Cr concentrations used as a parameter. As the Cr concentration increases, the transfer temperature from antiferromagnetic to ferromagnetic of $(Mn_{100-x}Cr_x)_2Sb$ shifts to the higher temperature side, and after transition, the magnetization increases abruptly. Further, the rise of magnetization is steeper than in a conventional material. Therefore, $(Mn_{100-x}Cr_x)_2Sb$ has more definite transfer temperature in the range of 40 to 200° C. than the conventional DyFeCo, and it is suitable as a material for the magneto-optical recording medium using an MSR technique.

Curie temperature of $(Mn_{100-x}Cr_x)_2Sb$ was studied, and it was constant at about 230° C. regardless of the Cr concentration. Therefore, recording of information was performed by heating the medium to a temperature not lower than 230° C., and by using beam having the wavelength of 780 nm, with the track pitch of 1.6 μm and recording linear velocity of 5 m/sec.

Figure 44:
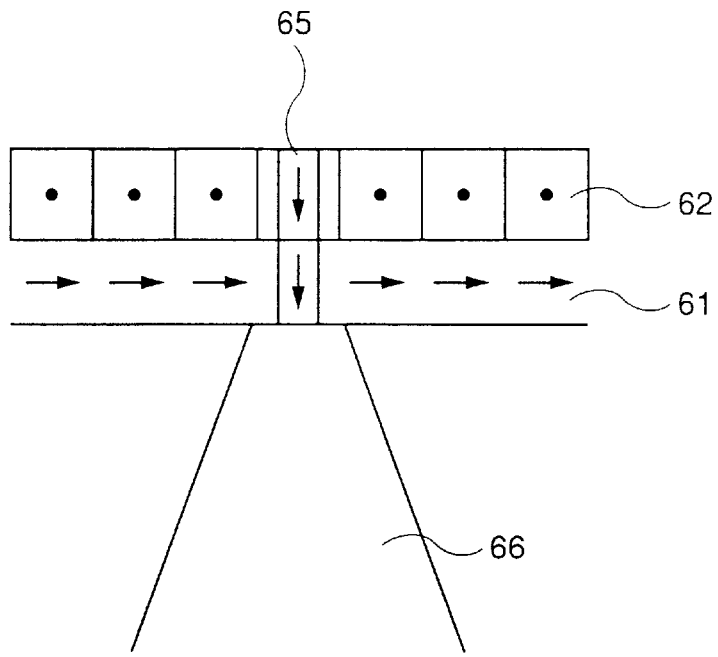
FIG. 44 is a schematic diagram showing the principal of reading of the medium in accordance with Example 16.

As for the temperature for reading, it should desirably be about 100° C., as the Curie temperature of $(Mn_{100-x}Cr_x)_2Sb$ is 230° C. In this example, $(Mn_{80}Cr_{20})_2Sb$ of which the Cr concentration is 20 at. % was used. As shown in FIG. 44, when the magneto-optical recording medium of this example is irradiated with a reading beam 66, the recording layer 62 is heated, the transition from antiferromagnetic to ferromagnetic occurs in the heated area 65, and magnetization occurs. Under the antiferromagnetic area where magnetization has not occurred, magnetization is not transferred to the reading layer 61 which is the in-plane magnetization film. The reading layer under this area is maintained in the state of in-plane magnetization, and serves as a mask. Therefore, information of only the heated area 65 is read. Reading from an area smaller than the emitted beam diameter becomes possible, that is, MSR reading becomes possible. The reading signal appears abruptly when the reading power becomes 1.5 mW or larger, and it was found that MSR reading was performed. The CNR with the reproducing power of 2.5 mW and the domain of 0.3 μm was 40 dB. Accordingly, the information in the recording layer is clearly transferred to the reading layer at a temperature of not lower than 100° C., and other than the reading area, there is no magnetic influence from $(Mn_{80}Cr_{20})_2Sb$ to $Gd_{30}Fe_{55}Co_{15}$. In this example, the mask effect is further enhanced, reading noises are low, and highly uniform MSR reading with a high MSR effect is possible.

Further, in the present invention, as shown in FIG. 43, clear transition from antiferromagnetic to ferromagnetic occurs when the Cr concentration of $(Mn_{100-x}Cr_x)_2Sb$ is in the range of 10 to 30 at. %. Therefore, by applying $(Mn_{100-x}Cr_x)_2Sb$ having a Cr concentration within this range to the recording layer, similar MSR reading as described above becomes possible.

Figure 45:
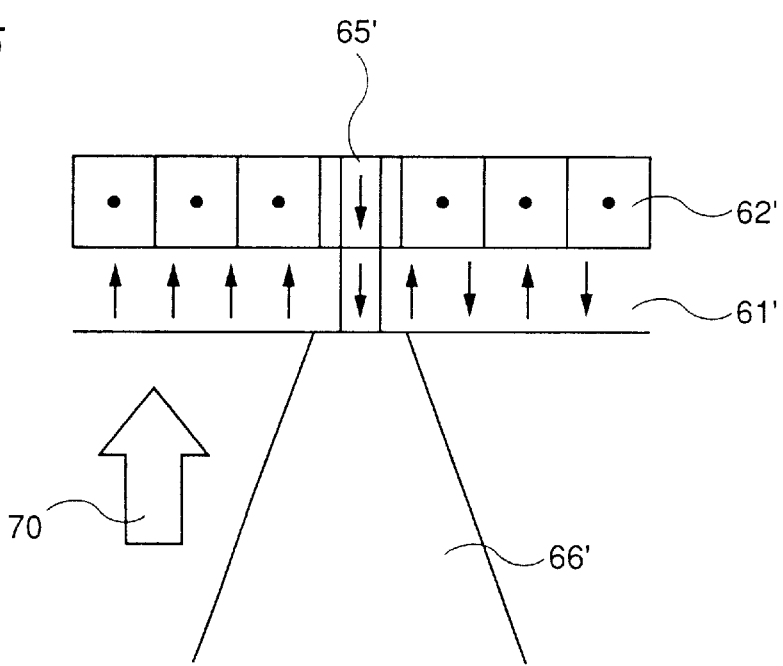
FIG. 45 is a schematic diagram showing the principal of reading of the medium in accordance with Example 16.

Further, though $Gd_{30}Fe_{55}Co_{15}$ which is an in-plane magnetization film at room temperature was used as the reading layer in this example, it is not limited to this material, and any material to which magnetization of the recording layer is transferred may be used. For example, when initialization magnetic field for aligning the direction of magnetization of the reading layer is used, TbFe, GdCo, TbCo, TbFeCo or the like which is a perpendicular magnetization film, may be used. In that case, by applying initialization magnetic field 70 as shown in FIG. 45, the direction of magnetization of the reading layer is aligned in advance such that magnetization of reading layer 61' is directed to the recording layer 62' and thereafter reading is performed by irradiation of laser beam 66'. In the high temperature area 65', magnetization occurs in recording layer 62', and hence magnetization of reading layer 61' which has been directed to the recording layer 62' at first is inverted to the same direction as the magnetization of recording layer 62' by exchange coupling force, and the information of the recording layer 62' is transferred to the reading layer 61'. Therefore, reading of information becomes possible only in the high temperature area 65'. Further, when a perpendicular magnetization film having a coercive force of at most 1 kOe is used, the magnetic domain to be transferred disappears, and hence masking is formed behind the beam, enabling MSR reading.

Meanwhile, the recording layer is not limited to $(Mn_{80}Cr_{20})_2Sb$, and any material having appropriate primary transition temperature may be used. For example, a magnetic body including $Mn_2Sb$ with V, Co, Cu, Zn, Ge or As added thereto may be used. Compositions of materials exhibiting satisfactory results are $(Mn_{93}V_7)_2Sb$, $(Mn_{75}Co_{25})_2Sb$, $(Mn_{90}Cu_{10})_2Sb$, $(Mn_{90}Zn_{10})_2Sb$, $(Mn_{90}Ge_{10})_2Sb$ and $(Mn_{80}As_{20})_2Sb$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium, comprising:

a transparent substrate;

an underlying layer formed on said transparent substrate;

a reading layer consisting essentially of a first magnetic material formed on said underlying layer; and a recording layer consisting essentially of a second magnetic material formed on said reading layer; wherein the direction of magnetization of said second magnetic material of said recording layer is transferable to said first magnetic material of said reading layer, by heating, said second magnetic material of said recording layer being anti-ferromagnetic at a room temperature and coverted from anti-ferromagnetic to ferromagnetic by said heating, a primary transition temperature from anti-ferromagnetic to ferromagnetic of said second magnetic material is at least about 50° C., and when Kerr rotation angle of light reflected from said reading layer is measured while temperatures of said reading and recording layers are elevated, the difference between the Kerr rotation angle at an elevated temperature and the Kerr rotation angle at room temperature is approximately proportional to Cth power of difference between said elevated temperature and said room temperature, where C is at least 8.0.

2. The magneto-optical recording medium according to claim 1, wherein said second magnetic material is a substance represented by $(Mn_{100-x}M_x)_2Sb$ wherein M is selected from the group consisting of Cr, V, Co, Cu, Zn, Ge and As, and x is from 0 to 100.

3. The magneto-optical recording medium according to claim 1, wherein said second magnetic material is a substance represented by $(Mn_{100-X}M_X)_2Sb$ the values in the parenthesis represented in percentage, wherein M is selected from the group consisting of Cr, V, Co, Cu, Zn, Ge and As, and X is from 0 to 100.

4. A magneto-optical recording medium, comprising:

a trasparent substrate;

an underlying layer formed on said transparent substrate;

a reading layer consisting essentially of a first magnetic material formed on said underlying layer; and a recording layer consisting essentially of a second magnetic material formed on said reading layer; wherein the direction of magnetization of said second magnetic material of said recording layer is transferable to said first magnetic material of said reading layer, by heating, said second magnetic material of said recording layer being anti-ferromagnetic at a room temperature and coverted from anti-ferromagnetic to ferromagnetic by said heating, a primary transition temperature from anti-ferromagnetic to ferromagnetic of said second magnetic material is at least about 50° C., and when magnetization occurs in said recording layer, said reading layer is exchange-coupled with said recording layer by said magnetization, and when Kerr rotation angle of light reflected from said reading layer is measured while temperatures of said reading and recording layers are elevated, the difference between the Kerr rotation angle at an elevated temperature and the Kerr rotation angle at room temperature is approximately proportional to Cth power of difference between said elevated temperature and said room temperature, where C is at least 8.0.

5. The magneto-optical recording medium according to claim 4, wherein said second magnetic material is a substance represented by $(Mn_{100-X}M_X)_2Sb$ the values in the parenthesis represented in atomic percent (at. %), wherein M is selected from the group consisting of Cr, V, Co, Cu, Zn, Ge and As, and X is from 0 to 100.

6. The magneto-optical recording medium according to claim 4, wherein said M is Cr and said x is 10 to30.

* * * * *

UNITED STATES PATENT AND TRADEMARK OFFICE
CERTIFICATE OF CORRECTION

PATENT NO. : 5,968,678
DATED : Oct. 19, 1999
INVENTOR(S) : Kenji TANASE et al.

It is certified that error appears in the above-identified patent and that said Letters Patent is hereby corrected as shown below:

Title page item [75], correct the following inventor's name:

Kenji Torazawa

[73] - ASSIGNEE should be: Sanyo Electric Co., Ltd.

Signed and Sealed this

Fifth Day of September, 2000

Attest:

Q. TODD DICKINSON

*Attesting Officer*    *Director of Patents and Trademarks*